(12) United States Patent
Joshi et al.

(10) Patent No.: US 9,350,998 B2
(45) Date of Patent: May 24, 2016

(54) CODING OF SIGNIFICANCE FLAGS

(71) Applicant: QUALCOMM Incorporated, San Diego, CA (US)

(72) Inventors: Rajan Laxman Joshi, San Diego, CA (US); Joel Sole Rojals, La Jolla, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 273 days.

(21) Appl. No.: 13/929,287

(22) Filed: Jun. 27, 2013

(65) Prior Publication Data

US 2014/0003529 A1 Jan. 2, 2014

Related U.S. Application Data

(60) Provisional application No. 61/666,690, filed on Jun. 29, 2012.

(51) Int. Cl.
| | | |
|---|---|---|
| *H04N 7/12* | (2006.01) | |
| *G06K 9/46* | (2006.01) | |
| *H04N 19/60* | (2014.01) | |
| *H04N 19/13* | (2014.01) | |
| *H04N 19/18* | (2014.01) | |
| *H04N 19/463* | (2014.01) | |

(52) U.S. Cl.
CPC ......... *H04N 19/00775* (2013.01); *H04N 19/13* (2014.11); *H04N 19/18* (2014.11); *H04N 19/463* (2014.11)

(58) Field of Classification Search
CPC . H04N 19/00775; H04N 19/13; H04N 19/18; H04N 19/463
See application file for complete search history.

(56) References Cited

U.S. PATENT DOCUMENTS

| | | | | |
|---|---|---|---|---|
| 9,172,962 | B2 * | 10/2015 | Nguyen | H04N 19/176 |
| 2012/0230417 | A1 * | 9/2012 | Sole Rojals | H04N 19/00109 |
| | | | | 375/240.18 |
| 2013/0003858 | A1 * | 1/2013 | Sze | H04N 19/50 |
| | | | | 375/240.18 |
| 2013/0016789 | A1 * | 1/2013 | Lou | H04N 19/176 |
| | | | | 375/240.18 |

(Continued)

FOREIGN PATENT DOCUMENTS

| | | | | |
|---|---|---|---|---|
| DE | WO 2011128303 | A2 * | 10/2011 | H04N 19/50 |
| WO | WO 2011128303 | A2 * | 10/2011 | |

OTHER PUBLICATIONS

Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.

(Continued)

*Primary Examiner* — Dave Czekaj
*Assistant Examiner* — Tsion B Owens
(74) *Attorney, Agent, or Firm* — Shumaker & Sieffert, P.A.

(57) ABSTRACT

A video coder determines, based at least in part on a distance between a current sub-block of a transform coefficient block and a sub-block that contains a last significant coefficient (LSC) of the transform coefficient block, coding contexts for significance flags for transform coefficients of the current sub-block. Furthermore, the video coder entropy codes, based on the coding contexts for the significance flags for the transform coefficients of the current sub-block, the significance flags for the transform coefficients of the current sub-block.

28 Claims, 12 Drawing Sheets

(56) References Cited

U.S. PATENT DOCUMENTS

| | | | |
|---|---|---|---|
| 2013/0051459 A1 | 2/2013 | Kirchhoffer et al. | |
| 2013/0051475 A1 | 2/2013 | Joshi et al. | |
| 2013/0064294 A1 | 3/2013 | Sole et al. | |
| 2013/0107969 A1* | 5/2013 | Nguyen | H04N 19/196 375/240.18 |
| 2013/0128985 A1 | 5/2013 | He et al. | |
| 2014/0086307 A1* | 3/2014 | Karczewicz | H04N 19/70 375/240.02 |

OTHER PUBLICATIONS

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 11-20, 2012, JCTVC-J1003_d7, 261 pp.

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 9," 11th Meeting: Shanghai, CN, Oct. 10-19, 2012, JCTVC-K1003_v7, 290 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 21-30, 2011, JCTVC-G1103_d2, 214 pp.

International Search Report and Written Opinion—PCT/US2013/048698—ISA/EPO—Dec. 19, 2013, 16 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Kumakura, et al., "Non-CE3: Simplified context derivation for significance map", JCT-VC Meeting; 100. MPEG Meeting; Apr. 27, 2012-May 7, 2012; Geneva; (Joint Collaborative Team on Video Coding of ISO/IEC JTC1/SC29/WG11 and ITU-T SG.16); XP030112059, 8 pp.

Nguyen, et al., "Improved Context Modeling for Coding Quantized Transform Coefficients in Video Compression", Dec. 8, 2010, Picture Coding Symposium 2010; Dec. 8, 2010-Dec. 10, 2010; Nagoya, XP030082008, 4 pp.

Partial International Search Report—PCT/US2013/048698—ISA/EPO—Oct. 22, 2013, 6 pp.

Wiegand et al., "WD1: Working Draft 1 of High-Efficiency Video Coding", JCTVC-C403, 3rd Meeting: Guangzhou, CN, Oct. 7-15, 2010, 137 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

Winken, et al., "Video coding technology proposal by Fraunhofer HHI", JCT-VC Meeting; Apr. 15, 2010-Apr. 23, 2010; Dresden; (Jointcollaborative Team on Video Coding of ISO/IEC JTC1/SC29/WG11 and ITU-TSG. 16) ; URL: http://WFTP3. ITU. INT/AV-ARCH/JCTVC-SITE/, No. XP030007556, XP030007557, 44 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

* cited by examiner

| $CGF_B=0, CGF_R=0$ | | | |
|---|---|---|---|
| 1 | 1 | 1 | 0 |
| 1 | 1 | 0 | 0 |
| 1 | 0 | 0 | 0 |
| 0 | 0 | 0 | 0 |

| $CGF_B=0, CGF_R=1$ | | | |
|---|---|---|---|
| 1 | 1 | 1 | 1 |
| 1 | 1 | 1 | 1 |
| 0 | 0 | 0 | 0 |
| 0 | 0 | 0 | 0 |

| $CGF_B=1, CGF_R=0$ | | | |
|---|---|---|---|
| 1 | 1 | 0 | 0 |
| 1 | 1 | 0 | 0 |
| 1 | 1 | 0 | 0 |
| 1 | 1 | 0 | 0 |

| $CGF_B=1, CGF_R=1$ | | | |
|---|---|---|---|
| 2 | 2 | 2 | 2 |
| 2 | 2 | 2 | 2 |
| 2 | 2 | 2 | 1 |
| 2 | 2 | 1 | 1 |

FIG. 2

| $CGF_B=0, CGF_R=0$ |||| 
|---|---|---|---|
| 2 | 2 | 2 | 1 |
| 2 | 2 | 1 | 1 |
| 2 | 1 | 1 | 1 |
| 1 | 1 | 1 | 1 |

| $CGF_B=0, CGF_R=1$ ||||
|---|---|---|---|
| 2 | 2 | 2 | 2 |
| 2 | 2 | 2 | 2 |
| 1 | 1 | 1 | 1 |
| 1 | 1 | 1 | 1 |

| $CGF_B=1, CGF_R=0$ ||||
|---|---|---|---|
| 2 | 2 | 1 | 1 |
| 2 | 2 | 1 | 1 |
| 2 | 2 | 1 | 1 |
| 2 | 2 | 1 | 1 |

| $CGF_B=1, CGF_R=1$ ||||
|---|---|---|---|
| 3 | 3 | 3 | 3 |
| 3 | 3 | 3 | 3 |
| 3 | 3 | 3 | 2 |
| 3 | 3 | 2 | 2 |

FIG. 3

CODING OF SIGNIFICANCE FLAGS

This application claims the benefit of U.S. Provisional Patent Application No. 61/666,690, filed Jun. 29, 2012, the entire content of which is incorporated herein by reference.

TECHNICAL FIELD

This disclosure relates to video coding (i.e., encoding and/or decoding of video data).

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicates the difference between the coded block and the predictive block. An intra-coded block is encoded according to an intra-coding mode and the residual data. For further compression, the residual data may be transformed from the pixel domain to a transform domain, resulting in residual coefficients, which then may be quantized. The quantized coefficients, initially arranged in a two-dimensional array, may be scanned in order to produce a one-dimensional vector of coefficients, and entropy coding may be applied to achieve even more compression.

SUMMARY

In general, this disclosure describes techniques related to coding of significance map flags in transform coefficient coding. In particular, a video coder may determine, based at least in part on a distance between a current sub-block of a transform coefficient block and a sub-block that contains a last significant coefficient (LSC) of the transform coefficient block, coding contexts for significance flags for transform coefficients of the current sub-block. The video coder may entropy code, based on the coding contexts for the significance flags for the transform coefficients of the current sub-block, the significance flags for the transform coefficients of the current sub-block.

In one example, this disclosure describes a method of decoding video data, the method comprising: determining, based at least in part on a distance between a current sub-block of a transform coefficient block and a sub-block that contains a LSC of the transform coefficient block, coding contexts for significance flags for transform coefficients of the current sub-block, wherein the current sub-block and the sub-block that contains the LSC of the transform coefficient blocks are among a plurality of sub-blocks of the transform coefficient block, each of the sub-blocks of the transform coefficient block containing the same number of transform coefficients; entropy decoding, based on the coding contexts for the significance flags for the transform coefficients of the current sub-block, the significance flags for the transform coefficients of the current sub-block; and reconstructing, based in part on the significance flags for the transform coefficients of the current sub-block, a coding block of the video data.

In another example, this disclosure describes a method of encoding video data, the method comprising: determining, based at least in part on a distance between a current sub-block of a transform coefficient block and a sub-block that contains a LSC of the transform coefficient block, coding contexts for significance flags for transform coefficients of the current sub-block, wherein the current sub-block and the sub-block that contains the LSC of the transform coefficient blocks are among a plurality of sub-blocks of the transform coefficient block, each of the sub-blocks of the transform coefficient block containing the same number of transform coefficients; entropy encoding, based on the coding contexts for the significance flags for the transform coefficients of the current sub-block, the significance flags for the transform coefficients of the current sub-block; and generating a bitstream that includes the entropy-encoded significance flags for the transform coefficients of the current sub-block.

In another example, this disclosure describes a video coder comprising one or more processors configured to: determine, based at least in part on a distance between a current sub-block of a transform coefficient block and a sub-block that contains a last significant coefficient (LSC) of the transform coefficient block, coding contexts for significance flags for transform coefficients of the current sub-block, wherein the current sub-block and the sub-block that contains the LSC of the transform coefficient blocks are among a plurality of sub-blocks of the transform coefficient block, each of the sub-blocks of the transform coefficient block containing the same number of transform coefficients; and entropy code, based on the coding contexts for the significance flags for the transform coefficients of the current sub-block, the significance flags for the transform coefficients of the current sub-block.

In another example, this disclosure describes a video coder comprising: means for determining, based at least in part on a distance between a current sub-block of a transform coefficient block and a sub-block that contains a LSC of the transform coefficient block, coding contexts for significance flags for transform coefficients of the current sub-block, wherein the current sub-block and the sub-block that contains the LSC of the transform coefficient blocks are among a plurality of sub-blocks of the transform coefficient block, each of the sub-blocks of the transform coefficient block containing the same number of transform coefficients; and means for entropy coding, based on the coding contexts for the significance flags for the transform coefficients of the current sub-block, the significance flags for the transform coefficients of the current sub-block.

In another example, this disclosure describes a computer-readable data storage medium having instructions stored thereon that, when executed, configure a video coder to: determine, based at least in part on a distance between a current sub-block of a transform coefficient block and a sub-block that contains a LSC of the transform coefficient block, coding contexts for significance flags for transform coefficients of the current sub-block, wherein the current sub-block and the sub-block that contains the LSC of the transform coefficient blocks are among a plurality of sub-blocks of the transform coefficient block, each of the sub-blocks of the transform coefficient block containing the same number of transform coefficients; and entropy code, based on the coding contexts for the significance flags for the transform coefficients of the current sub-block, the significance flags for the transform coefficients of the current sub-block.

In another example, this disclosure describes a method of coding video data, the method comprising: determining a particular value for a current sub-block of a transform coefficient block, wherein the current sub-block is among a plurality of sub-blocks of the transform coefficient block, each of the sub-blocks of the transform coefficient blocks containing the same number of transform coefficients, wherein the particular value is a weighted cumulative count of previous-block transform coefficients that are greater than a threshold, the previous-block transform coefficients being in sub-blocks of the transform coefficient block coded prior to the current sub-block; determining, based at least in part on the particular value for the current sub-block, coding contexts for significance flags for transform coefficients of the current sub-block; and entropy coding, based on the coding contexts for the significance flags for the transform coefficients of the current sub-block, the significance flags for the transform coefficients of the current sub-block.

The details of one or more examples of the disclosure are set forth in the accompanying drawings and the description below. Other features, objects, and advantages will be apparent from the description, drawings, and claims.

BRIEF DESCRIPTION OF DRAWINGS

FIG. 2 illustrates an example context assignment, in accordance with one or more techniques of this disclosure.

FIG. 3 illustrates another example context assignment, in accordance with one or more techniques of this disclosure.

DETAILED DESCRIPTION

Figure 1:
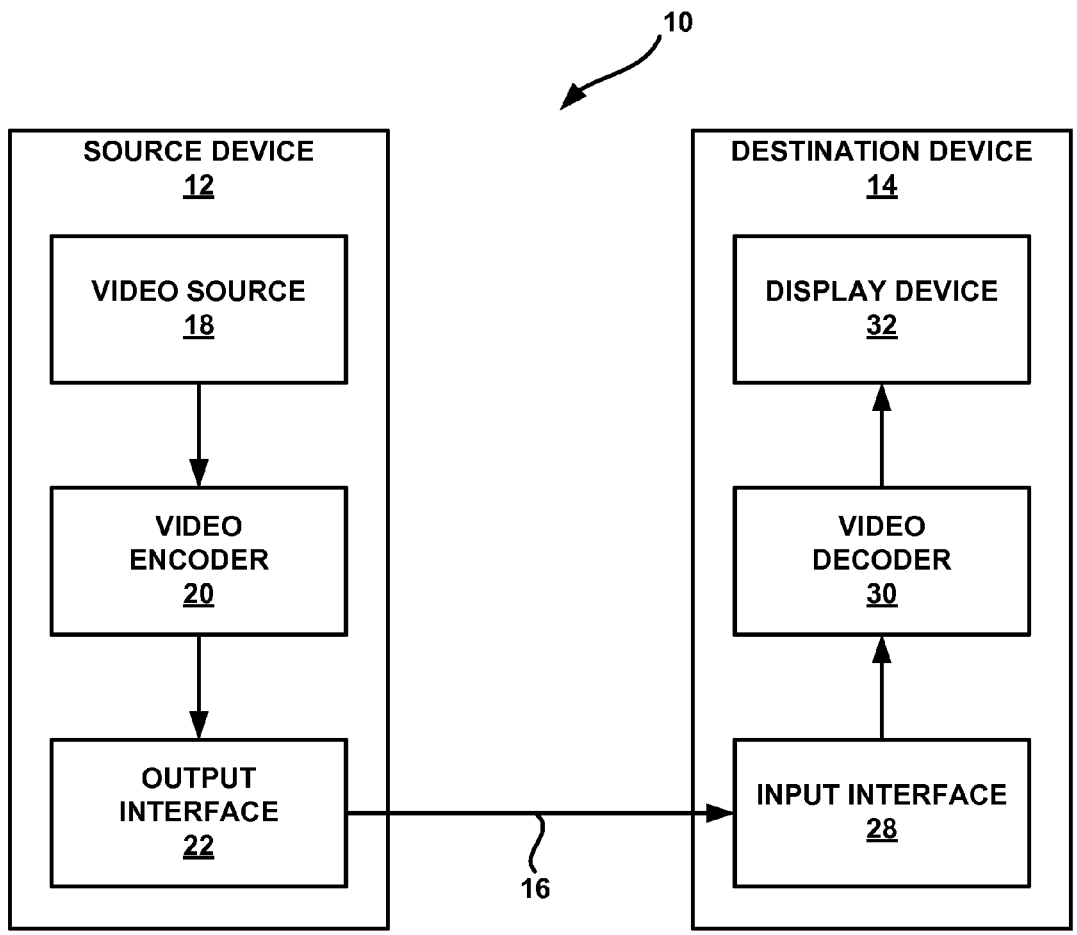
FIG. 1 is a block diagram illustrating an example video coding system that may utilize the techniques described in this disclosure.

In High-Efficiency Video Coding (HEVC) and other video coding specifications, a video encoder generates blocks of transform coefficients based on differences between original sample blocks and corresponding predictive sample blocks. The video encoder may then perform Context-Adaptive Binary Arithmetic Coding ("CABAC") encoding on syntax elements representing the transform coefficients. A video decoder may perform CABAC decoding to recover the syntax elements representing the transform coefficients. The video decoder may use the transform coefficients to reconstruct the sample blocks.

When a video coder (e.g., a video encoder or a video decoder) codes the syntax elements indicating the transform coefficients of a transform coefficient block (i.e., the transform coefficient syntax elements), the video coder may use a 4×4 sub-block scan. Specifically, the video coder may scan the 4×4 sub-blocks of the transform coefficient block using a top-right to bottom-left diagonal scanning pattern, starting with a lower-right 4×4 sub-block. In some examples, the size of the transform coefficient block may be 16×16 or 32×32. When the video coder entropy codes the syntax elements indicating the transform coefficients of a 4×4 sub-block, the video coder may perform a coding pass that CABAC codes significance flags for the transform coefficients of the sub-block. A significance flag for a transform coefficient indicates whether the transform coefficient is 0 or non-zero. During the coding pass, the video coder scans the transform coefficients of the sub-block in a reverse direction using a top-right to bottom-left diagonal scanning pattern, starting with a lower-right transform coefficient of the 4×4 sub-block.

When CABAC coding significance flags of a transform coefficient block, the video coder may determine coded group flags (CGFs) for each 4×4 sub-block of the transform coefficient block. If the CGF for the sub-block is equal to 1, a significance flag is coded for each transform coefficient of the sub-block. When the video coder performs CABAC coding on a current sub-block having a CGF equal to 1, the video coder may determine context offsets for significance flags of transform coefficients of the current sub-block. A context offset is a numerical value that identifies a coding context. If the transform coefficient block is a luma transform coefficient block (i.e., the transform coefficient block is based on luma samples), the video coder may determine the context offset for a significance flag of a transform coefficient based on a position within the current 4×4 sub-block of the transform coefficient, whether the current sub-block includes the DC transform coefficient of the transform coefficient block, a CGF for a sub-block to the right of the current 4×4 sub-block (denoted $CGF_R$), and a CGF for a sub-block below the current 4×4 sub-block (denoted $CGF_B$).

Specifically, the video coder may determine initial context offsets for the significance flags for the transform coefficients of the current 4×4 sub-block based on $CGF_R$ and $CGF_B$. Next, if the current sub-block does not include the DC transform coefficient of the transform coefficient block, the video coder adds 3 to the initial context offsets for the significance flags of the current sub-block. The DC transform coefficient of the transform coefficient block may be the transform coefficient at the upper-left corner of the transform coefficient block. If the transform coefficient block is a chroma transform coefficient block, the video coder may determine the context offsets for the significance flags for the transform coefficients of a sub-block in the same way as the video coder would for a luma transform coefficient block, except that the video coder does not add 3 to the initial context offsets for the significance flags if the sub-block does not contain the DC transform coefficient.

There may be several problems with the context selection scheme described above. For example, the probabilities that a particular significance flag is equal to 1 or 0 may be dependent on whether any transform coefficients with magnitudes greater than 1 and 2 are present in previous sub-blocks. Similarly, the probabilities that a particular significance flag is equal to 1 or 0 may be dependent on the number of significant transform coefficients (i.e., non-zero transform coefficients) in previous sub-blocks or the distance of the current 4×4 sub-block from a 4×4 sub-block in which the last significant coefficient (LSC) of the transform coefficient block occurred. The LSC of a transform coefficient block is the first non-zero transform coefficient to occur in the transform coefficient block when the transform coefficient block is scanned according to the reverse sub-block scanning order of the transform coefficients of the transform coefficient block. In other words, the LSC of a transform coefficient block is the first significant transform coefficient encountered when the transform coefficient block is scanned according to the reverse sub-block scanning order. The context selection scheme described above does not take advantage of these dependencies when selecting contexts for CABAC coding significance flags. Not taking advantage of these dependencies may increase bitstream size.

The techniques of this disclosure may exploit one or more of these dependencies to decrease bitstream size. In accordance with some example techniques of this disclosure, a video coder may determine, based at least in part on a distance between a current sub-block of a transform coefficient block and a sub-block that contains a LSC of the transform coefficient block, coding contexts for significance flags for transform coefficients of the current sub-block. The current sub-block and the sub-block that contains the LSC of the transform coefficient blocks are among a plurality of sub-blocks of the transform coefficient block. Each of the sub-blocks of the transform coefficient block may contain the same number of transform coefficients. For instance, each of the sub-blocks may be of size 4×4. Furthermore, the video coder may entropy code, based on the coding contexts for the significance flags for the transform coefficients of the current sub-block, the significance flags for the transform coefficients of the current sub-block.

In accordance with other example techniques of this disclosure, a video coder may determine a particular value (e.g., numOne) for a current sub-block of a transform coefficient block. The current sub-block is among a plurality of sub-blocks of the transform coefficient block. Each of the sub-blocks of the transform coefficient blocks contains the same number of transform coefficients. Furthermore, the particular value may be a weighted cumulative count of previous-block transform coefficients that are greater than a threshold. In such examples, the previous-block transform coefficients may be in sub-blocks of the transform coefficient block coded prior to the current sub-block. The video coder may determine, based at least in part on the particular value for the current sub-block, coding contexts for significance flags for transform coefficients of the current sub-block. Additionally, the video coder may entropy code, based on the coding contexts for the significance flags for the transform coefficients of the current sub-block, the significance flags for the transform coefficients of the current sub-block.

FIG. 1 is a block diagram illustrating an example video coding system 10 that may utilize the techniques of this disclosure. As used herein, the term "video coder" refers generically to both video encoders and video decoders. In this disclosure, the terms "video coding" or "coding" may refer generically to video encoding or video decoding.

As shown in FIG. 1, video coding system 10 includes a source device 12 and a destination device 14. Source device 12 generates encoded video data. Accordingly, source device 12 may be referred to as a video encoding device or a video encoding apparatus. Destination device 14 may decode the encoded video data generated by source device 12. Accordingly, destination device 14 may be referred to as a video decoding device or a video decoding apparatus. Source device 12 and destination device 14 may be examples of video coding devices or video coding apparatuses.

Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, in-car computers, or the like.

Destination device 14 may receive encoded video data from source device 12 via a channel 16. Channel 16 may comprise one or more media or devices capable of moving the encoded video data from source device 12 to destination device 14. In one example, channel 16 may comprise one or more communication media that enable source device 12 to transmit encoded video data directly to destination device 14 in real-time. In this example, source device 12 may modulate the encoded video data according to a communication standard, such as a wireless communication protocol, and may transmit the modulated video data to destination device 14. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the Internet). The one or more communication media may include routers, switches, base stations, or other equipment that facilitate communication from source device 12 to destination device 14.

In another example, channel 16 may include a storage medium that stores encoded video data generated by source device 12. In this example, destination device 14 may access the storage medium, e.g., via disk access or card access. The storage medium may include a variety of locally-accessed data storage media such as Blu-ray discs, DVDs, CD-ROMs, flash memory, or other suitable digital storage media for storing encoded video data.

In a further example, channel 16 may include a file server or another intermediate storage device that stores encoded video data generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), file transfer protocol (FTP) servers, network attached storage (NAS) devices, and local disk drives.

Destination device 14 may access the encoded video data through a standard data connection, such as an Internet connection. Example types of data connections may include wireless channels (e.g., Wi-Fi connections), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of a variety of multimedia applications, such as over-the-air television broadcasts, cable television transmissions, satellite television transmissions, streaming video transmissions, e.g., via the Internet, encoding of video data for storage on a data storage medium, decoding of video data stored on a data storage medium, or other applications. In some examples, video coding system 10 may be configured to support one-way or two-way video transmission to support applications such as video streaming, video playback, video broadcasting, and/or video telephony.

FIG. 1 is merely an example and the techniques of this disclosure may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In many examples, the encoding and decoding is performed by devices that do not communicate with one another, but simply encode data to memory and/or retrieve and decode data from memory.

In the example of FIG. 1, source device 12 includes a video source 18, a video encoder 20, and an output interface 22. In some examples, output interface 22 may include a modulator/demodulator (modem) and/or a transmitter. Video source 18 may include a video capture device, e.g., a video camera, a video archive containing previously-captured video data, a video feed interface to receive video data from a video content provider, and/or a computer graphics system for generating video data, or a combination of such sources of video data.

Video encoder 20 may encode video data from video source 18. In some examples, source device 12 directly transmits the encoded video data to destination device 14 via output interface 22. In other examples, the encoded video data may also be stored onto a storage medium or a file server for later access by destination device 14 for decoding and/or playback.

In the example of FIG. 1, destination device 14 includes an input interface 28, a video decoder 30, and a display device 32. In some examples, input interface 28 includes a receiver and/or a modem. Input interface 28 may receive encoded video data over channel 16. Display device 32 may be integrated with or may be external to destination device 14. In general, display device 32 displays decoded video data. Display device 32 may comprise a variety of display devices, such as a liquid crystal display (LCD), a plasma display, an organic light emitting diode (OLED) display, or another type of display device.

Video encoder 20 and video decoder 30 each may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

This disclosure may generally refer to video encoder 20 "signaling" certain information to another device, such as video decoder 30. The term "signaling" may generally refer to the communication of syntax elements and/or other data used to decode the compressed video data. Such communication may occur in real- or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium.

In some examples, video encoder 20 and video decoder 30 operate according to a video compression standard, such as ISO/IEC MPEG-4 Visual and ITU-T H.264 (also known as ISO/IEC MPEG-4 AVC), including its Scalable Video Coding (SVC) extension, Multiview Video Coding (MVC) extension, and MVC-based 3DV extension. In some instances, any legal bitstream conforming to MVC-based 3DV always contains a sub-bitstream that is compliant to a MVC profile, e.g., stereo high profile. Furthermore, there is an ongoing effort to generate a three-dimensional video (3DV) coding extension to H.264/AVC, namely AVC-based 3DV. In other examples, video encoder 20 and video decoder 30 may operate according to ITU-T H.261, ISO/IEC MPEG-1 Visual, ITU-T H.262 or ISO/IEC MPEG-2 Visual, ITU-T H.263, ISO/IEC MPEG-4 Visual, and ITU-T H.264, ISO/IEC Visual, or another video coding specification.

In other examples, video encoder 20 and video decoder 30 may operate according to the High Efficiency Video Coding (HEVC) standard developed by the Joint Collaboration Team on Video Coding (JCT-VC) of ITU-T Video Coding Experts Group (VCEG) and ISO/IEC Motion Picture Experts Group (MPEG). A draft of the HEVC standard, referred to as "HEVC Working Draft 7" is described in Bross et al., "High Efficiency Video Coding (HEVC) text specification draft 7," Joint Collaborative Team on Video Coding (JCT-VC) of ITU-T SG16 WP3 and ISO/IEC JTC1/SC29/WG11, $9^{th}$ Meeting, Geneva, Switzerland, May 2012, and is available as of Jun. 27, 2013, from http://phenix.it-sudparis.eu/jct/doc_end_user/documents/9_Geneva/wg11/JCTVC-I1003-v5.zip. Another draft of the HEVC standard, referred to as "HEVC Working Draft 8" is described in Bross et al., "High Efficiency Video Coding (HEVC) text specification draft 8," Joint Collaborative Team on Video Coding (JCT-VC) of ITU-T SG16 WP3 and ISO/IEC JTC1/SC29/WG11, $10^{th}$ Meeting, Stockholm, Sweden, July 2012. Furthermore, there are ongoing efforts to produce SVC, multi-view coding, and 3DV extensions for HEVC. The SVC extension of HEVC may be referred to as HEVC-SVC. The 3DV extension of HEVC may be referred to as HEVC-based 3DV or 3D-HEVC.

In HEVC and other video coding standards, a video sequence typically includes a series of pictures. Pictures may also be referred to as "frames." A picture may include three sample arrays, denoted $S_L$, $S_{Cb}$ and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may comprise a coding tree block of luma samples, two corresponding coding tree blocks of chroma samples, and syntax structures used to code the samples of the coding tree blocks. A coding tree block may be an N×N block of samples. A CTU may also be referred to as a "tree block" or a "largest coding unit" (LCU). The CTUs of HEVC may be broadly analogous to the macroblocks of other video coding standards, such as H.264/AVC. However, a CTU is not necessarily limited to a particular size and may include one or more coding units (CUs). A slice may include an integer number of CTUs ordered consecutively in the raster scan.

This disclosure may use the term "video unit" or "video block" to refer to one or more blocks of samples and syntax structures used to code samples of the one or more blocks of samples. Example types of video units may include CTUs, CUs, PUs, transform units (TUs), macroblocks, macroblock partitions, and so on.

To generate a coded CTU, video encoder 20 may recursively perform quad-tree partitioning on the coding tree blocks of a CTU to divide the coding tree blocks into coding blocks, hence the name "coding tree units." A coding block is an N×N block of samples. A CU may comprise a coding block of luma samples and two corresponding coding blocks of chroma samples of a picture that has a luma sample array, a Cb sample array and a Cr sample array, and syntax structures used to code the samples of the coding blocks. Video encoder 20 may partition a coding block of a CU into one or more prediction blocks. A prediction block may be a rectangular (i.e., square or non-square) block of samples on which the same prediction is applied. A prediction unit (PU) of a CU may comprise a prediction block of luma samples, two corresponding prediction blocks of chroma samples of a picture, and syntax structures used to predict the prediction block samples. Video encoder 20 may generate predictive luma, Cb and Cr blocks for luma, Cb and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU. If video encoder 20 uses inter prediction to generate the predictive blocks of a PU, video encoder 20 may generate the predictive blocks of the PU based on decoded samples of one or more pictures other than the picture associated with the PU.

After video encoder 20 generates predictive luma, Cb and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb, and Cr residual blocks of a CU into one or more luma, Cb, and Cr transform blocks. A transform block may be a rectangular block of samples on which the same transform is applied. A transform unit (TU) of a CU may comprise a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block.

Video encoder 20 may apply one or more transforms to a luma transform block of a TU to generate a luma coefficient block for the TU. A transform coefficient block may be a two-dimensional array of transform coefficients. A transform coefficient may be a scalar quantity. Video encoder 20 may apply one or more transforms to a Cb transform block of a TU to generate a Cb transform coefficient block for the TU. Video encoder 20 may apply one or more transforms to a Cr transform block of a TU to generate a Cr transform coefficient block for the TU.

After generating a transform coefficient block (e.g., a luma transform coefficient block, a Cb transform coefficient block, or a Cr transform coefficient block), video encoder 20 may quantize the transform coefficient block. Quantization generally refers to a process in which transform coefficients are quantized to possibly reduce the amount of data used to represent the transform coefficients, providing further compression. Furthermore, video encoder 20 may inverse quantize transform coefficients and apply an inverse transform to the transform coefficients in order to reconstruct transform blocks of TUs of CUs of a picture. Video encoder 20 may use the reconstructed transform blocks of TUs of a CU and the predictive blocks of PUs of the CU to reconstruct coding blocks of the CU. By reconstructing the coding blocks of each CU of a picture, video encoder 20 may reconstruct the picture. Video encoder 20 may store reconstructed pictures in a decoded picture buffer (DPB). Video encoder 20 may use reconstructed pictures in the DPB for inter prediction and intra prediction.

After video encoder 20 quantizes a transform coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients.

Video encoder 20 may output a bitstream that includes a sequence of bits that forms a representation of coded pictures and associated data. The bitstream may comprise a sequence of network abstraction layer (NAL) units. Each of the NAL units includes a NAL unit header and encapsulates a raw byte sequence payload (RBSP). The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits. Certain types of NAL units may include entropy-encoded syntax elements that indicate quantized transform coefficients.

Video decoder 30 may receive a bitstream that includes a coded representation of video data. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. For instance, video decoder 30 may use motion vectors of PUs to determine predictive blocks for the PUs of a current CU.

In addition, video decoder 30 may inverse quantize transform coefficient blocks associated with TUs of the current CU. Video decoder 30 may perform inverse transforms on the transform coefficient blocks to reconstruct transform blocks associated with the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture. Video decoder 30 may store decoded pictures in a decoded picture buffer for output and/or for use in decoding other pictures.

As mentioned above, after video encoder 20 quantizes a transform coefficient block, video encoder 20 may perform statistical lossless coding (which may be referred to by the term "entropy encoding") with respect to the syntax elements indicating the quantized transform coefficients. For example, video encoder 20 may perform CABAC on the syntax elements indicating the quantized transform coefficients. Video encoder 20 may output the entropy-encoded syntax elements in a bitstream.

To apply CABAC encoding to a syntax element, video encoder 20 may binarize the syntax element to form a series of one or more bits, which are referred to as "bins." In addition, video encoder 20 may identify a coding context. The coding context may identify probabilities of coding bins having particular values. For instance, a coding context may indicate a 0.7 probability of coding a 0-valued bin and a 0.3 probability of coding a 1-valued bin. After identifying the coding context, video encoder 20 may divide an interval into a lower sub-interval and an upper sub-interval. One of the sub-intervals may be associated with the value 0 and the other sub-interval may be associated with the value 1. The widths of the sub-intervals may be proportional to the probabilities indicated for the associated values by the identified coding context. If a bin of the syntax element has the value associated with the lower sub-interval, the encoded value may be equal to the lower boundary of the lower sub-interval. If the same bin of the syntax element has the value associated with the upper sub-interval, the encoded value may be equal to the lower boundary of the upper sub-interval. To encode the next bin of the syntax element, video encoder 20 may repeat these steps with the interval being the sub-interval associated with the value of the encoded bit. When video encoder 20 repeats these steps for the next bin, video encoder 20 may use modified probabilities based on the probabilities indicated by the identified coding context and the actual values of bins encoded.

When video decoder 30 performs CABAC decoding on a syntax element, video decoder 30 may identify a coding context. Video decoder 30 may then divide an interval into a lower sub-interval and an upper sub-interval. One of the sub-intervals may be associated with the value 0 and the other sub-interval may be associated with the value 1. The widths of the sub-intervals may be proportional to the probabilities indicated for the associated values by the identified coding context. If the encoded value is within the lower sub-interval, video decoder 30 may decode a bin having the value associated with the lower sub-interval. If the encoded value is within the upper sub-interval, video decoder 30 may decode a bin having the value associated with the upper sub-interval. To decode a next bin of the syntax element, video decoder 30 may repeat these steps with the interval being the sub-interval that contains the encoded value. When video decoder 30 repeats these steps for the next bin, video decoder 30 may use modified probabilities based on the probabilities indicated by the identified coding context and the decoded bins. Video decoder 30 may then de-binarize the bins to recover the syntax element.

The syntax elements indicating the quantized transform coefficients may include significance flags, greater than 1 flags, greater than 2 flags, sign flags, and transform coefficient level remaining syntax elements. Each significance flag indicates whether a corresponding transform coefficient is significant (i.e., non-zero). Each greater than 1 flag indicates whether the absolute magnitude of a corresponding transform coefficient is greater than 1. Each greater than 2 flag indicates whether the absolute magnitude of a corresponding transform coefficient is greater than 2. Each sign flag indicates whether a corresponding transform coefficient is positive or negative. If the significance flag, the greater than 1 flag and the greater than 2 flag have been coded and are all 1, the corresponding coefficient level remaining syntax element indicates the absolute value of the coefficient minus 3.

In HEVC Working Draft 7, when a video coder (e.g., video encoder 20 or video decoder 30) CABAC codes the syntax elements indicating the transform coefficients of a transform coefficient block (e.g., a 16×16 or 32×32 transform coefficient block), the video coder uses a 4×4 sub-block scan. That is, in HEVC Working Draft 7, for 16×16 and 32×32 blocks, a 4×4 sub-block scan is used. In other versions of HEVC, the video coder may use a 4×4 sub-block scan when the video coder CABAC codes the syntax elements indicating the transform coefficient blocks having sizes other than 16×16 or 32×32, such as transform coefficient blocks having sizes of 8×8. Specifically, the video coder may scan the 4×4 sub-blocks of a transform coefficient block using a top-right to bottom-left diagonal scanning pattern, starting with a lower-right 4×4 sub-block. In other words, the sub-blocks are scanned in the reverse direction using a top-right to bottom-left scan.

When the video coder entropy codes the syntax elements indicating the transform coefficients of a 4×4 sub-block, the video coder may perform five coding passes: one coding pass for significance flags, one coding pass for greater than 1 flags, one coding pass for greater than 2 flags, one coding pass for sign flags, and one coding pass for coefficient level remaining syntax elements. This disclosure may refer to the significance flags, greater than 1 flags, greater than 2 flags, sign flags, and coefficient level remaining syntax elements collectively as the "transform coefficient syntax elements." During each coding pass through a sub-block, the video coder scans the transform coefficients of the sub-block in a reverse direction using a top-right to bottom-left diagonal scanning pattern, starting with a lower-right transform coefficient of the 4×4 sub-block. In other words, within a sub-block, the transform coefficients are also scanned in the reverse direction using a top-right to bottom-left scan. Each 4×4 sub-block is coded in five coding passes, namely, significance, greater than 1, greater than 2, sign, and coefficient level remaining. The video coder may perform all five coding passes on the transform coefficients of a sub-block before processing a next sub-block of the transform coefficient block. When the video coder scans a transform coefficient of a sub-block during a coding pass for a transform coefficient syntax element, the video coder may perform CABAC coding on the transform coefficient syntax element for the transform coefficient.

The coding pass for CABAC coding significance flags of a 4×4 sub-block has two parts. In the first part, the video coder determines, based on a coded group flag (CGF) for the 4×4 sub-block, whether there are any non-zero transform coefficients in the 4×4 sub-block. The CGF may be signaled in a bitstream or inferred. In other words, a CGF is coded (or inferred) for each 4×4 sub-block to indicate whether there are any non-zero coefficients in the sub-block. If the CGF for the 4×4 sub-block is equal to 1, a significance flag is coded for each transform coefficient of the 4×4 sub-block. That is, if CGF is 1, a significant coefficient flag for each transform coefficient is coded.

When a video coder performs CABAC coding on a current 4×4 sub-block having a CGF equal to 1, the video coder may determine context offsets for significance flags of transform coefficients of the current 4×4 sub-block. A context offset is a numerical value that may be used to identify a coding context. In some examples, the video coder may add a context offset to a base value to determine a context identifier of a coding context. In HEVC Working Draft 7, if the 16×16 or 32×32 transform coefficient block is a luma transform coefficient block (i.e., the transform coefficient block is based on luma samples), the video coder may determine the context offset for a significance flag of a transform coefficient based on a position within the current 4×4 sub-block of the transform coefficient, whether the current 4×4 sub-block includes the DC transform coefficient of the 16×16 or 32×32 transform coefficient block, a CGF for a 4×4 sub-block to the right of the current 4×4 sub-block (denoted $CGF_R$), and a CGF for a 4×4 sub-block below the current 4×4 sub-block (denoted $CGF_B$). In other words, in HEVC Working Draft 7, the significance flag contexts are dependent on the position of the transform coefficient within the 4×4 sub-block, whether the sub-block contains the DC transform coefficient, and the CGFs for the sub-block to the right ($CGF_R$) and below ($CGF_B$).

The transform coefficients within the 4×4 sub-block are assigned contexts depending on $CGF_R$ and $CGF_B$, as shown in FIG. 2. FIG. 2 is a conceptual diagram illustrating context assignment. In FIG. 2, context numbering starts with 0 instead of a proper context offset (e.g., 18). For example, if $CGF_R$ and $CGF_B$ are equal to 0 and 1, respectively, and a current transform coefficient is the top-left transform coefficient of the current sub-block, the video coder may assign a context offset of 1 to the significance flag for the current transform coefficient. In another example, if $CGF_R$ and $CGF_B$ are equal to 1 and 0, respectively, and a current transform coefficient is at position (2, 2) of the current sub-block, the video coder may assign a context offset of 0 to the significance flag for the current transform coefficient.

Specifically, in section 9.3.3.1.4 of HEVC Working Draft 7, the video coder may set a variable prevSig to 0. Next, if xC is less than (1<<log 2TrafoWidth)−1, the video coder may set prevSig as follows:

$$prevSig\mathrel{+}=significant\_coefficient\_group\_flag[xCG+1][yCG],$$

where xC denotes the x coordinate of the current sub-block within the current transform coefficient block, log 2TrafoWidth is the log base 2 of the width of the current transform coefficient block, and significant_coefficient_group_flag[xCG+1][yCG] is the CFG for the sub-block to the right of the current sub-block. The horizontal and vertical coefficient group positions xCG and yCG are set equal to (xC>>2) and (yC>>2), respectively. When yC is less than (1<<log 2TrafoHeight)−1, the video coder may set prevSig as follows:

$$prevSig\mathrel{+}=(significant\_coeff\_group\_flag[xCG][yCG+1]<<1),$$

where yC denotes the y coordinate of the current sub-block within the current transform coefficient block, log 2TrafoHeight is the log base 2 of the height of the current transform coefficient block, and significant_coefficient_group_flag[xCG][yCG+1] is the CGF for the sub-block below the current sub-block. Furthermore, if prevSig is equal to 0, the video coder may set the variable sigCtx (i.e., the context offset) as follows:

$$sigCtx=(xC-(xCG<<2))+(yC-(yCG<<2))<=2?1:0$$

If prevSig is equal to 1, the video coder may set sigCtx as follows:

$$sigCtx=(yC-(yCG<<2))<=1?1:0$$

If prevSig is equal to 2, the video coder may set sigCtx as follows:

$$sigCtx=(xC-(xCG<<2))<=1?1:0$$

Otherwise, if prevSig is equal to 3, the video coder may set sigCtx as follows:

$$sigCtx=(xC-(xCG<<2))+(yC-(yCG<<2))<=4?2:1$$

Setting sigCtx in this way results in the same value of sigCtx as identifying a value in the tables of FIG. 2.

Next, if the current 4×4 sub-block does not include the DC transform coefficient of the transform coefficient block, the video coder may add 3 to the initial context offsets for the significance flags. In other words, if the 4×4 sub-block does not contain the DC transform coefficient, a context offset of 3 is applied. For example, if the initial context offset for a significance flag for a transform coefficient of the current 4×4 sub-block is 2 and the current 4×4 sub-block does not include the DC transform coefficient, the video coder uses a context offset of 5 for the significance flag. In other words, if a 4×4 sub-block does not contain the DC transform coefficient, and the context assignment from FIG. 2 is 2, the actual context used would be 5. Thus, for a luma transform coefficient block, there are six contexts. The DC transform coefficient of a transform coefficient block is a top-left transform coefficient of the transform coefficient block.

If the transform coefficient block is a chroma transform coefficient block (i.e., the transform coefficient block is based on or derived from chroma samples), the video coder may determine the context offsets for the significance flags for the transform coefficients of a 4×4 sub-block in the same way as the video coder would for a luma transform coefficient block, except that the video coder does not add 3 to the initial context offsets for the significance flags if the 4×4 sub-block does not contain the DC transform coefficient. In other words, for chroma transform coefficients, the context offset based on whether the 4×4 sub-block contains the DC transform coefficient is not applied. Thus, for a chroma transform coefficient block, there are a total of three contexts. That is, only three contexts are used for chroma. The video coder may use a separate context to CABAC code the DC transform coefficient of the transform coefficient block. In other words, the DC transform coefficient also uses a separate context.

Specifically, in HEVC Working Draft 7, a video coder may determine whether cIdx is equal to 0 and whether (xC>>2)+ (yC>>2) is greater than 0. cIdx is equal to 0 if the current transform coefficient block is a luma transform coefficient block. xC indicates an x coordinate of the top-left coefficient of the current sub-block relative to a top-left transform coefficient of the current transform coefficient block. yC indicates a y coordinate of the top-left coefficient of the current sub-block relative to the top-left transform coefficient of the current transform coefficient block. Thus, (xC>>2)+(yC>>2) is greater than 0 if the current sub-block does not contain the DC coefficient of the current transform coefficient block. If cIdx is equal to 0 and (xC>>2)+(yC>>2) is greater than 0, the video coder may add 21 to the context offset. Otherwise, the video coder may add 18 to the context offset. In HEVC Working Draft 7, 18 is a base value for context offsets. Thus, the video coder effectively adds 3 (i.e., 21−18) to the context offset if the current sub-block does not contain the DC coefficient.

The video coder may determine, based on a context offset of a significance flag for a transform coefficient of a transform coefficient block, a coding context to use for CABAC coding the significance flag. In one example, the video coder may determine, based on a current coefficient scan position of the transform coefficient and size and color information for the transform coefficient block, a context index increment (ctxIdxInc) value. Section 9.3.3.1.4 of HEVC Working Draft 7 describes a derivation process for ctxIdxInc for the significance flags. Specifically, in section 9.3.3.1.4 of HEVC Working Draft 7, a video coder may derive a context offset (sigCtx) as described above. Furthermore, if the current transform coefficient block is a luma transform coefficient block (i.e., cIdx is equal to 0), the video coder may set ctxIdxInc to sigCtx. Otherwise, the video coder may set ctxIdxInc equal to the sigCtx+24. Furthermore, in this example, the video coder may add ctxIdxInc to a value ctxIdxOffset to derive a context index (ctxIdx) that identifies a coding context.

Furthermore, in sections 9.3.3.1.5 and 9.3.3.1.6 of HEVC Working Draft 7, the contexts for "greater than 1" and "greater than 2" flags are dependent on a weighted cumulative count of the number of transform coefficients with level magnitude greater than 1. In this disclosure, this weighted cumulative count may be referred to as "numOne" or "numGreater1." Transform coefficients from farther sub-blocks of a transform coefficient block in scan order are given less weight in numOne than closer sub-blocks of the transform coefficient block. Specifically, in HEVC Working Draft 7, if the current sub-block (i.e., the sub-block at position i in a transform coefficient block) is the first sub-block of the transform coefficient block, the video coder may determine that numOne is equal to 0. Otherwise, in HEVC Working Draft 7, the video coder may set a variable j to the index of the previous sub-block in the current transform coefficient block. Furthermore, in HEVC Working Draft 7, the video coder may set a variable prevNumGreater1 to the number of coefficient levels having an absolute value greater than 1 in the sub-block j. Next, in HEVC Working Draft 7, the video coder may set numGreaterOne (i.e., numOne) to the value of numGreaterOne derived for the sub-block j. The video coder may then update numGreaterOne as follows: numGreaterOne= (numGreaterOne+prevNumGreater1)>>(j−i−1).

There may be several drawbacks to the context selection scheme described above. For example, the probabilities that a particular significance flag is equal to 1 or 0 may be dependent on whether any transform coefficients with magnitudes greater than 1 and 2 are present in previous 4×4 sub-blocks. In other words, the probability of 1 for a particular significance flag may also be dependent on whether any transform coefficients of magnitude greater than 1 and 2 are present in previous sub-blocks. Similarly, the probabilities that a particular significance flag is equal to 1 or 0 may be dependent on the number of significant transform coefficients in previous 4×4 sub-blocks or the distance of the current 4×4 sub-block from a 4×4 sub-block in which the last significant coefficient of the transform coefficient block occurred. In other words, the probability may also depend on the number of significant transform coefficients in previous sub-blocks or the distance between the current sub-block from the sub-block in which the last significant coefficient occurred. That is, from significance flag statistics, it is observed that if numOne is greater than 0, the probability of the significance flag being 1 goes up for each position within the 4×4 sub-block. The same observation holds true for the 4×4 sub-block containing the DC transform coefficient of the transform coefficient block. The context selection scheme described above does not take advantage of these dependencies when selecting contexts for CABAC coding significance flags. Not taking advantage of these dependencies may increase bitstream size.

This disclosure provides several example techniques that may improve coding of significance flags. The techniques of this disclosure may exploit the dependencies mentioned in the previous paragraph. The example techniques of this disclosure are described below with reference with 16×16 and 32×32 luma blocks. However, the techniques of this disclosure may be extended to 8×8 blocks and chroma blocks, or blocks of other sizes.

In accordance with the techniques of this disclosure, when a video coder (e.g., video encoder 20 or video decoder 30) entropy codes (e.g., CABAC codes) transform coefficient syntax elements of a transform coefficient block, the video coder may scan sub-blocks (e.g., 4×4 sub-blocks) of the transform coefficient block in a top-right to bottom-left diagonal scanning pattern, starting with a lower right sub-block, significance flags for transform coefficients of a transform coefficient block. Furthermore, when the video coder entropy codes the transform coefficient syntax elements of a sub-block of the transform coefficient block, the video coder may perform the five coding passes described above: one coding pass for significance flags, one coding pass for greater than 1 flags, one coding pass for greater than 2 flags, one coding pass for sign flags, and one coding pass for coefficient level remaining syntax elements.

When the video coder performs the coding pass for significance flags of transform coefficients of a current sub-block of a transform coefficient block, the video coder may determine $CGF_R$ and $CGF_B$ as described above. Furthermore, the video coder may determine, in accordance with the tables of FIG. 2, based on $CGF_R$ and $CGF_B$ and the positions of transform coefficients within the current sub-block, context offsets for the significance flags for the transform coefficients of the current sub-block. In addition, the video coder may determine a value of numOne, as described above. That is, the video coder may determine a weighted cumulative count of the number of transform coefficients with absolute magnitude greater than 1.

In one example, if numOne is greater than 0, the video coder may treat a current sub-block as though the current sub-block contains the DC transform coefficient of the block. As indicated above, the video coder may increment the context offsets for significance flags of the current sub-block by 3 if the current sub-block does not contain the DC transform coefficient of the transform coefficient block. Hence, if numOne is greater than 0 or if the current sub-block contains the DC transform coefficient of the transform coefficient block, the video coder does not increment the context offsets for the significance flags of the current sub-block. Thus, if the video coder uses the tables of FIG. 2 to determine the context offset and if numOne is greater than 0 (or alternatively greater than 1) or if the current sub-block contains the DC transform coefficient of the transform coefficient block, context offsets 0, 1, and 2 are used. In other words, the context assignment according to FIG. 2 is performed, but no context offset is applied. Conversely, if numOne is not greater than 0 and the current sub-block does not contain the DC transform coefficient of the transform coefficient block, the video coder may increment the context offset for the significance flags of the current sub-block by a particular value, e.g., 3. Thus, if the video coder determines the context offset according to the tables of FIG. 2, if numOne is not greater than 0 and the current sub-block does not contain the DC transform coefficient of the transform coefficient block, and if the particular value is equal to 3, context offsets of 3, 4, and 5 may be used.

In some examples, other thresholds for numOne (instead of 'greater than 0') may be used. Furthermore, instead of using numOne, the video coder may use a similar variable that keeps a weighted cumulative count of transform coefficients that are significant or sum of the number of significant transform coefficients in the bottom sub-block and the right sub-block. In such a case, a different criterion (rather than 'greater than 0' or greater than 1) may be used. Thus, instead of numOne being a weighted cumulative count of the number of transform coefficients with level magnitudes greater than 1 in previous sub-blocks of the transform coefficient block, numOne may be a weighted cumulative count of the number of transform coefficients with level magnitudes greater than 0, 2, 3, etc. in previous sub-blocks of the transform coefficient block. The previous sub-blocks may be sub-blocks of the transform coefficient block occurring in scanning order prior to the current sub-block. For instance, if the variable is greater than 1 or if the current sub-block does not contain the DC transform coefficient of the transform coefficient block, the video coder does not further increment the context offset. However, if numOne is not greater than 1 and if the current sub-block includes the DC value, the video coder may add 3 to the context offsets of the significance flags.

In another example, the weighted cumulative count of the number of transform coefficients with level magnitude greater than 1, represented by numOne, is used in a slightly different manner than the examples provided above. In this example, the video coder may assign the context in the manner described in HEVC Working Draft 7. That is, the video coder may determine, in accordance with the tables of FIG. 2, context offsets for significance flags for transform coefficients of a current sub-block and add 3 to the context offsets of the significance flags if the current sub-block does not include the DC transform coefficient of the transform coefficient block. However, in accordance with an example technique of this disclosure, if numOne is greater than 0, an additional context offset of 6 is used. That is, the video coder may add 6 to the context offsets of the significance flags of the values of the current sub-block. Thus, in this example, six additional contexts may be used.

For instance, in the example of the previous paragraph, if the context assignment according to HEVC Working Draft 7 is 4, and numOne is greater than 0, the video coder assigns a context offset of 10 to that transform coefficient. In other examples, the video coder may use other thresholds for numOne (instead of 'greater than 0'). Furthermore, in some examples, the video coder may create multiple context offsets for multiple ranges of numOne. For instance, the video coder may add a first value to a context offset if numOne is greater than a first threshold and add a second value to the context offset if numOne is greater than a second threshold. In addition, instead of numOne, the video coder may use a similar variable that keeps a weighted cumulative count of transform coefficients that are significant or sum of number of significant transform coefficients in the bottom and right sub-block. For such a variable, the video coder may use a different threshold (rather than 'greater than 0').

In another example, a particular sub-block of a transform coefficient block may include the LSC of the transform coefficient block. In this example, the video coder may determine, based at least in part on a distance between the current sub-block of the transform coefficient block and the sub-block of the transform coefficient block that contains the LSC of the transform coefficient block, contexts for significance flags for values of the second sub-block. That is, in this example, the context may depend on the distance between the current 4×4 sub-block and the 4×4 sub-block containing the LSC.

Thus, in this example, video decoder 30 may determine, based at least in part on a distance between a current sub-block of a transform coefficient block and a sub-block that contains a LSC of the transform coefficient block, coding contexts for significance flags for transform coefficients of the current sub-block. The current sub-block and the sub-block that contains the LSC of the transform coefficient blocks are among a plurality of sub-blocks of the transform coefficient block. Each of the sub-blocks of the transform coefficient block may contain the same number of transform coefficients (e.g., each sub-block may be a 4×4 block of transform coefficients). Furthermore, video decoder 30 may entropy decode, based on the coding contexts for the significance flags for the transform coefficients of the current sub-block, the significance flags for the transform coefficients of the current sub-block. Video decoder 30 may reconstruct, based in part on the significance flags for the transform coefficients of the current sub-block, a coding block of the video data.

Similarly, in this example, video encoder 20 may determine, based at least in part on a distance between a current sub-block of a transform coefficient block and a sub-block that contains a LSC of the transform coefficient block, coding contexts for significance flags for transform coefficients of the current sub-block. The current sub-block and the sub-block that contains the LSC of the transform coefficient blocks are among a plurality of sub-blocks of the transform coefficient block. Each of the sub-blocks of the transform coefficient block may contain the same number of transform coefficients. Video encoder 20 may entropy encode, based on the coding contexts for the significance flags for the transform coefficients of the current sub-block, the significance flags for the transform coefficients of the current sub-block. Furthermore, video encoder 20 may generate a bitstream that includes the entropy-encoded significance flags for the transform coefficients of the current sub-block.

In this example, let the index of the current sub-block be (i,j), where i and j represent the row and column indices within the sub-block grid of the current transform coefficient block. Similarly, let the position of the LSC be denoted by (lastY, lastX) where lastY corresponds to the row index of the LSC within the block and lastX corresponds to the column index of the LSC. Then, the video coder may determine the distance d between the current 4×4 sub-block and the 4×4 sub-block containing the last significant coefficient as:

$$d=(i+j)-((lastX>>2)+(lastY>>2)),$$

where >> represents the bitwise right-shift operation. If d is greater than 1, the video coder may use an additional context offset of 6. Thus, the video coder may use six additional contexts. For example, if the context assignment according to HEVC Working Draft 7 is 4, and d is greater than 1, the video coder may assign a context of 10 to that transform coefficient. In other examples, the video coder may use other thresholds for d instead of d is greater than 1.

Furthermore, in the example above, the video coder may create multiple context offsets for multiple ranges of d. In one example, the video coder may, in response to determining that the distance is greater than a first threshold, increment a context offset for a significance flag of a transform coefficient of a current sub-block by a first value. Furthermore, the video coder may, in response to determining that the distance is greater than a second threshold, increment the context offset by a second value. In this example, the second threshold is different than the first threshold and the second value is different than the first value.

In another example, the right sub-block of a transform coefficient block is to the right of a current sub-block of the transform coefficient block and a below sub-block of the transform coefficient block is below the current sub-block. Furthermore, in this example, the video coder may determine, for each respective transform coefficient of the current sub-block, a context offset for the respective transform coefficient based on a position within the current sub-block of the respective transform coefficient, whether the right sub-block includes any significant transform coefficients, and whether both sub-blocks include any significant transform coefficients. When numOne (e.g., a weighted cumulative count of transform coefficients in the previous sub-blocks with magnitudes greater than a threshold (e.g., 1)) is greater than 0, the video coder may increment by 1 the context offset for the significance flag for the respective transform coefficient. Thus, when numOne is greater than 0, the video coder may use the context offsets indicated in FIG. 3. FIG. 3 illustrates an example context assignment in accordance with one or more techniques of this disclosure. Thus, in some of the examples above, the video coder used additional context offsets based on numOne, distance from the 4×4 sub-block containing last significant transform coefficient, and a weighted cumulative count of number of significant transform coefficients to create additional contexts. In the current example, the video coder may use these criteria to modify the context assignment shown in FIG. 3. As one example, if numOne is greater than 0, the video coder may increment the context assignment by 1, as shown in FIG. 3.

Furthermore, in this example, when the transform coefficient block is a luma transform coefficient block and the second sub-block does not include a DC transform coefficient of the transform coefficient block, the video coder may increment by 4 the context offset for the significance flag for the respective transform coefficient. That is, in this case, if the 4×4 sub-block does not contain the DC transform coefficient, a context offset of 4 would be used. Thus, in this example, there are two additional contexts for a total of eight contexts.

The techniques of this disclosure are not necessarily restricted to 4×4 sub-blocks. For instance, if blocks are divided into sub-blocks of other sizes, such as 8×8, the techniques of this disclosure may still be applicable. Furthermore, this disclosure has described some example techniques with respect to the context assignment shown in FIG. 2. However, the techniques of this disclosure may be combined with other context assignments, such as the one described in Tsukuba et al., "Refined Significant Map Context Derivation for Large TU," Joint Collaborative Team on Video Coding (JCT-VC) of ITU-T SG 16 WP 3 and ISO/IEC JTC 1/SC 29/WG11, 10$^{th}$ Meeting, Stockholm, SE, document no. JCTVC-J0068, Jun. 29, 2012.

This disclosure describes example techniques with regard to coding of transform coefficients. However, if the transform is skipped (as in transform skip mode for 4×4 intra blocks), the methods may be applicable to coding of intra or inter prediction residual blocks. Thus, in this disclosure, the term "transform coefficient" may refer to either a coefficient generated by applying a transform to a block of residual sample values or a residual sample value.

Figure 4:
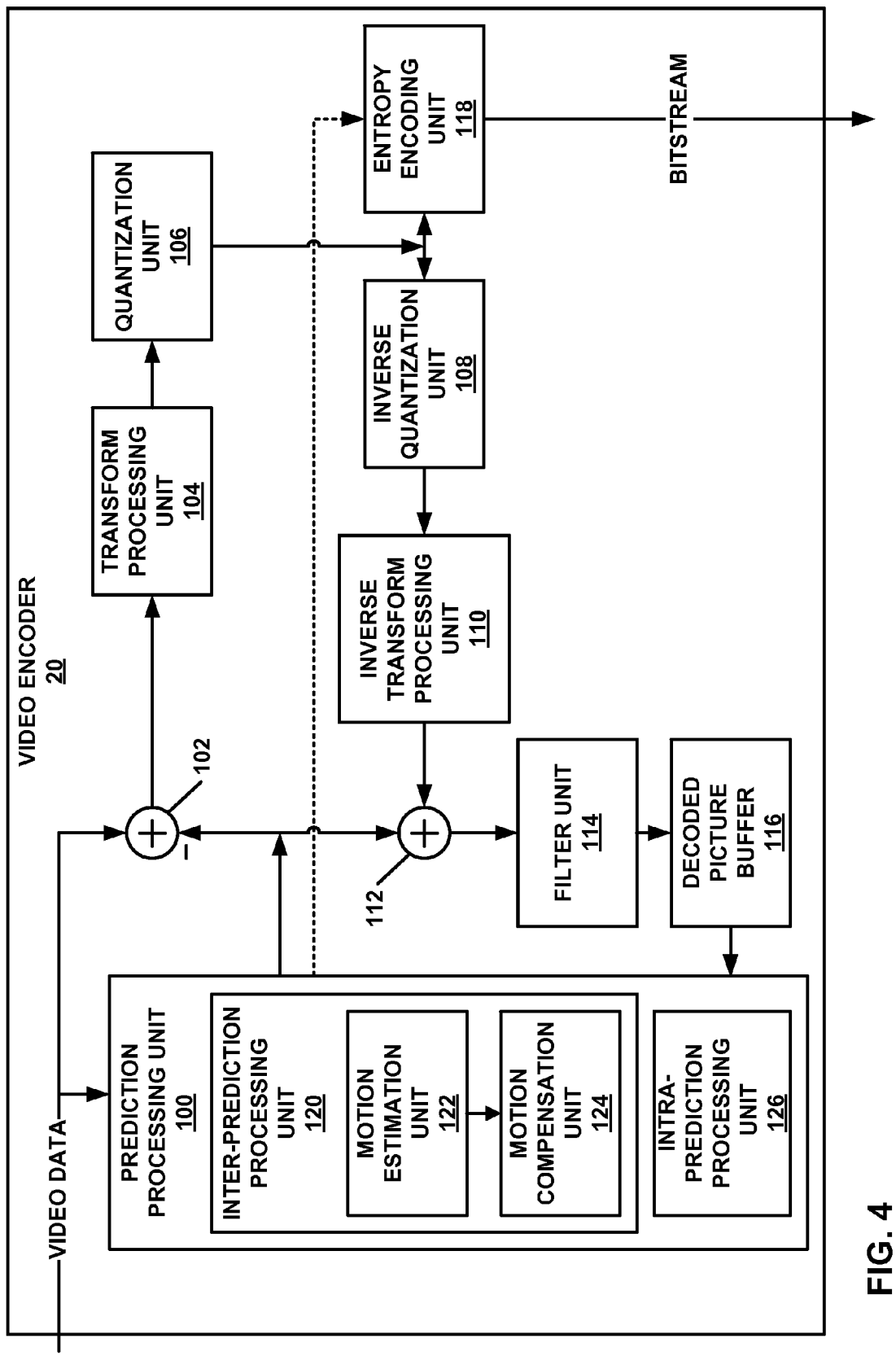
FIG. 4 is a block diagram illustrating an example video encoder that may implement the techniques described in this disclosure.

FIG. 4 is a block diagram illustrating an example video encoder 20 that may implement the techniques of this disclosure. FIG. 4 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

In the example of FIG. 4, video encoder 20 includes a prediction processing unit 100, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 includes a motion estimation unit 122 and a motion compensation unit 124. In other examples, video encoder 20 may include more, fewer, or different functional components.

Video encoder 20 may receive video data. Video encoder 20 may encode each CTU in a slice of a picture of the video data. Each of the CTUs may be associated with equally-sized luma coding tree blocks (CTBs) and corresponding CTBs of the picture. As part of encoding a CTU, prediction processing unit 100 may perform quad-tree partitioning to divide the CTBs of the CTU into progressively-smaller blocks. The smaller blocks may be coding blocks of CUs. For example, prediction processing unit 100 may partition a CTB associated with a CTU into four equally-sized sub-blocks, partition one or more of the sub-blocks into four equally-sized sub-sub-blocks, and so on.

Video encoder 20 may encode CUs of a CTU to generate encoded representations of the CUs (i.e., coded CUs). As part of encoding a CU, prediction processing unit 100 may partition the coding blocks of the CU among one or more PUs of the CU. Thus, each PU may be associated with a luma prediction block and two corresponding chroma prediction blocks. Video encoder 20 and video decoder 30 may support PUs having various sizes. The size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 120 may generate predictive data for a PU by performing inter prediction on each PU of a CU. The predictive data for the PU may include the predictive blocks of the PU and motion information for the PU. Inter-prediction processing unit 120 may perform different operations for a PU of a CU depending on whether the PU is in an I slice, a P slice, or a B slice. In an I slice, all PUs are intra predicted. Hence, if the PU is in an I slice, inter-prediction processing unit 120 does not perform inter prediction on the PU.

PUs in a P slice may be intra predicted or uni-directionally inter predicted. For instance, if a PU is in a P slice, motion estimation unit 122 may search the reference pictures in a list of reference pictures (e.g., "RefPicList0") for a reference region for the PU. The reference region for the PU may be a region, within a reference picture, that contains sample blocks that most closely corresponds to the prediction blocks of the PU. Motion estimation unit 122 may generate a reference index that indicates a position in RefPicList0 of the reference picture containing the reference region for the PU. In addition, motion estimation unit 122 may generate a motion vector that indicates a spatial displacement between a prediction block of the PU and a reference location associated with the reference region. For instance, the motion vector may be a two-dimensional vector that provides an offset from the coordinates in the current decoded picture to coordinates in a reference picture. Motion estimation unit 122 may output the reference index and the motion vector as the motion information of the PU. Motion compensation unit 124 may generate the predictive blocks of the PU based on actual or interpolated samples at the reference location indicated by the motion vector of the PU.

PUs in a B slice may be intra predicted, uni-directionally inter predicted, or bi-directionally inter predicted. Hence, if a PU is in a B slice, motion estimation unit 122 may perform uni-prediction or bi-prediction for the PU. To perform uni-prediction for the PU, motion estimation unit 122 may search the reference pictures of RefPicList0 or a second reference picture list ("RefPicList1") for a reference region for the PU. Motion estimation unit 122 may output, as the motion information of the PU, a reference index that indicates a position in RefPicList0 or RefPicList1 of the reference picture that contains the reference region, a motion vector that indicates a spatial displacement between a sample block of the PU and a reference location associated with the reference region, and one or more prediction direction indicators that indicate whether the reference picture is in RefPicList0 or RefPicList1. Motion compensation unit 124 may generate the predictive blocks of the PU based at least in part on actual or interpolated samples at the reference region indicated by the motion vector of the PU.

To perform bi-directional inter prediction for a PU, motion estimation unit 122 may search the reference pictures in RefPicList0 for a reference region for the PU and may also search the reference pictures in RefPicList1 for another reference region for the PU. Motion estimation unit 122 may generate reference indexes that indicate positions in RefPicList0 and RefPicList1 of the reference pictures that contain the reference regions. In addition, motion estimation unit 122 may generate motion vectors that indicate spatial displacements between the reference locations associated with the reference regions and a sample block of the PU. The motion information of the PU may include the reference indexes and the motion vectors of the PU. Motion compensation unit 124 may generate the predictive blocks of the PU based at least in part on actual or interpolated samples at the reference regions indicated by the motion vectors of the PU.

Intra-prediction processing unit 126 may generate predictive data for a PU by performing intra prediction on the PU. The predictive data for the PU may include predictive blocks for the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive data for the PU. Intra-prediction processing unit 126 may generate a predictive block for a PU based on samples of neighboring blocks. Different intra prediction modes may be associated with different sets of samples in the neighboring blocks. The neighboring blocks may be above, above and to the right, above and to the left, or to the left of the PU, assuming a left-to-right, top-to-bottom encoding order for PUs, CUs, and CTUs. Intra-prediction processing unit 126 may use various numbers of intra prediction modes, e.g., 33 directional intra prediction modes. In some examples, the number of intra prediction modes may depend on the size of the prediction blocks of the PU.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive blocks of the selected predictive data may be referred to herein as the selected predictive blocks.

Residual generation unit 102 may generate, based on the luma, Cb, and Cr coding block of a CU and the selected predictive luma, Cb, and Cr blocks of the PUs of the CU, a luma, Cb, and Cr residual blocks of the CU. For instance, residual generation unit 102 may generate the residual blocks of the CU such that each sample in the residual blocks has a value equal to a difference between a sample in a coding block of the CU and a corresponding sample in a corresponding selected predictive block of a PU of the CU.

Transform processing unit 104 may perform quad-tree partitioning to partition the residual blocks associated with a CU into transform blocks associated with TUs of the CU. Thus, a TU may be associated with a luma transform block and two corresponding chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually similar transform to a transform block. In some examples, transform processing unit 104 does not apply transforms to a transform block. In such examples, the transform block may be treated as a transform coefficient block.

Quantization unit 106 may quantize the transform coefficients in a transform coefficient block. The quantization process may reduce the bit depth associated with some or all of the transform coefficients. For example, an n-bit transform coefficient may be rounded down to an m-bit transform coefficient during quantization, where n is greater than m. Quantization unit 106 may quantize a transform coefficient block associated with a TU of a CU based on a quantization parameter (QP) value associated with the CU. Video encoder 20 may adjust the degree of quantization applied to the transform coefficient blocks associated with a CU by adjusting the QP value associated with the CU. Quantization may introduce loss of information, thus quantized transform coefficients may have lower precision than the original ones.

Inverse quantization unit 108 and inverse transform processing unit 110 may apply inverse quantization and inverse transforms to a transform coefficient block, respectively, to reconstruct a residual block from the transform coefficient block. Reconstruction unit 112 may add samples of the reconstructed residual block to corresponding samples from one or more predictive blocks generated by prediction processing unit 100 to produce a reconstructed transform block associated with a TU. By reconstructing transform blocks for each TU of a CU in this way, video encoder 20 may reconstruct the coding blocks of the CU.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. Inter-prediction processing unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from other functional components of video encoder 20. For example, entropy encoding unit 118 may receive transform coefficient blocks from quantization unit 106 and may receive syntax elements from prediction processing unit 100. Entropy encoding unit 118 may perform one or more entropy encoding operations on some such data to generate entropy-encoded data. For example, entropy encoding unit 118 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Entropy encoding unit 118 may use one or more of the techniques of this disclosure to entropy encode significance flags. Video encoder 20 may output a bitstream that includes entropy-encoded data generated by entropy encoding unit 118. The bitstream may also include syntax elements that are not entropy encoded.

Figure 5:
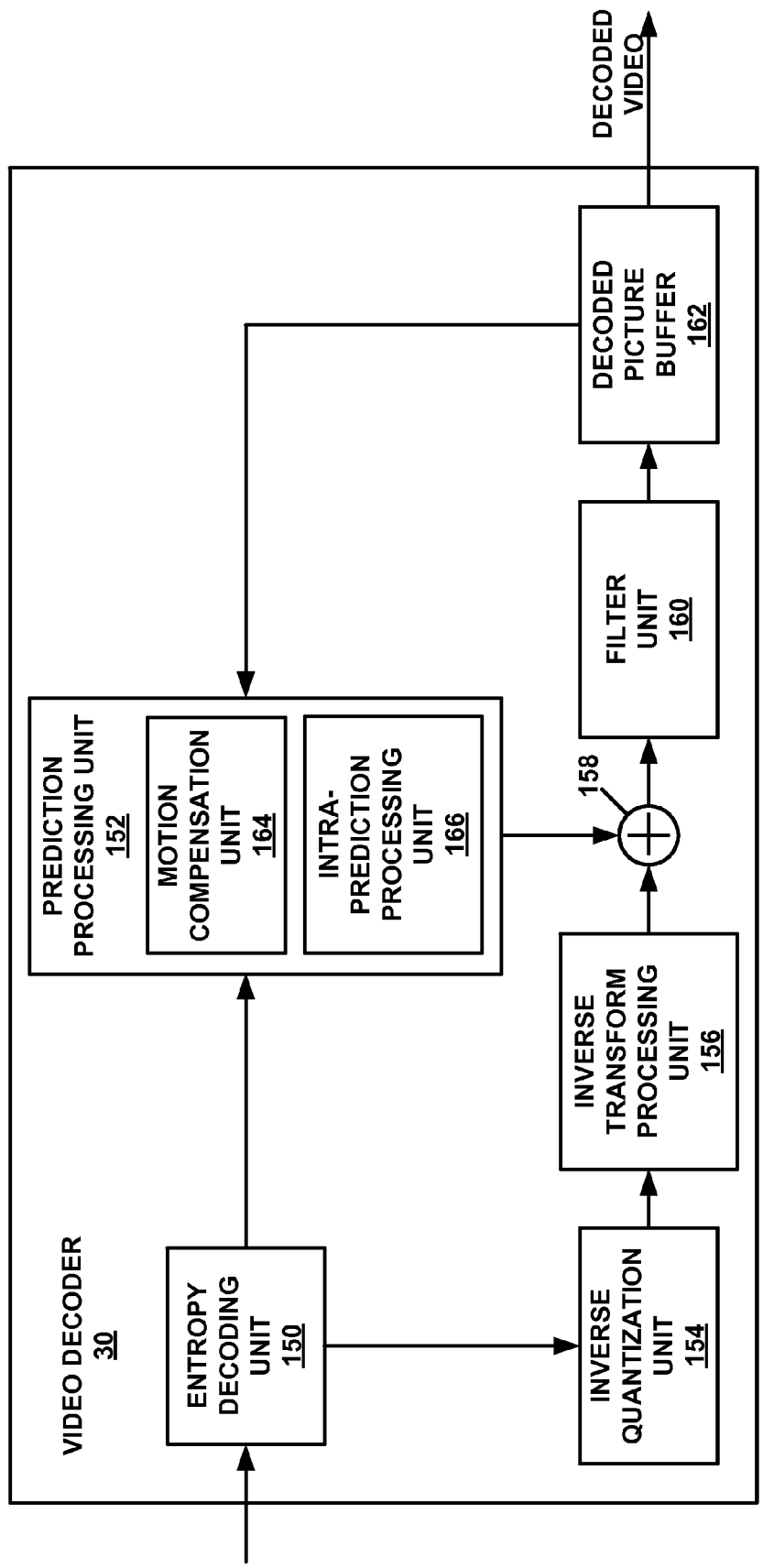
FIG. 5 is a block diagram illustrating an example video decoder that may implement the techniques described in this disclosure.

FIG. 5 is a block diagram illustrating an example video decoder 30 that may implement the techniques described in this disclosure. FIG. 5 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

In the example of FIG. 5, video decoder 30 includes an entropy decoding unit 150, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. In other examples, video decoder 30 may include more, fewer, or different functional components.

Entropy decoding unit 150 may receive NAL units and parse the NAL units to obtain syntax elements from a bitstream. Entropy decoding unit 150 may entropy decode entropy-encoded syntax elements in the NAL units. Prediction processing unit 152, inverse quantization unit 154, inverse transform processing unit 156, reconstruction unit 158, and filter unit 160 may generate decoded video data based on the syntax elements obtained from the bitstream.

The NAL units of the bitstream may include coded slice NAL units. As part of decoding the bitstream, entropy decoding unit 150 may entropy decode certain syntax elements in the coded slice NAL units. Entropy decoding unit 150 may use one or more of the example techniques of this disclosure to entropy decode significance flags. Each of the coded slices may include a slice header and slice data. The slice header may contain syntax elements pertaining to a slice. The syntax elements in the slice header may include a syntax element that identifies a PPS associated with a picture that contains the slice.

In addition to obtaining syntax elements from the bitstream, video decoder 30 may perform reconstruction operations on CUs. To perform the reconstruction operation on a CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 154 may inverse quantize, i.e., de-quantize, transform coefficient blocks associated with the TU. Inverse quantization unit 154 may use a QP value associated with the CU of the TU to determine a degree of quantization and, likewise, a degree of inverse quantization for inverse quantization unit 154 to apply.

After inverse quantization unit 154 inverse quantizes a transform coefficient block, inverse transform processing unit 156 may apply one or more inverse transforms to the transform coefficient block in order to generate a residual transform block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the transform coefficient block.

If a PU is encoded using intra prediction, intra-prediction processing unit 166 may perform intra prediction to generate predictive blocks for the PU. Intra-prediction processing unit 166 may use an intra prediction mode to generate the predictive luma, Cb, and Cr blocks for the PU based on the prediction blocks of spatially-neighboring PUs. Intra-prediction processing unit 166 may determine the intra prediction mode for the PU based on one or more syntax elements decoded from the bitstream.

Prediction processing unit 152 may construct a first reference picture list (RefPicList0) and a second reference picture list (RefPicList1) based on syntax elements obtained from the bitstream. Furthermore, if a PU is encoded using inter prediction, entropy decoding unit 150 may obtain motion information for the PU. Motion compensation unit 164 may determine, based on the motion information of the PU, one or more reference regions for the PU. Motion compensation unit 164 may generate, based on samples at the one or more reference blocks for the PU, predictive luma, Cb and Cr blocks for the PU.

Reconstruction unit 158 may use the residual luma, Cb, and Cr transform blocks associated with TUs of a CU and the predictive luma, Cb, and Cr blocks of the PUs of the CU, i.e., either intra-prediction data or inter-prediction data, as applicable, to reconstruct the luma, Cb, and Cr coding blocks of the CU. For example, reconstruction unit 158 may add samples of the luma, Cb and Cr transform blocks to corresponding samples of the predictive luma, Cb and Cr blocks to reconstruct the luma, Cb and Cr coding blocks of the CU.

Filter unit 160 may perform a deblocking operation to reduce blocking artifacts associated with the luma, Cb and Cr coding blocks of the CU. Video decoder 30 may store the luma, Cb and Cr coding blocks of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the luma, Cb and Cr blocks in decoded picture buffer 162, intra prediction or inter prediction operations on PUs of other CUs. In this way, video decoder 30 may obtain, from the bitstream, transform coefficient levels of the luma transform coefficient block, inverse quantize the transform coefficient levels, apply a transform to the transform coefficient levels to generate a transform block, generate, based at least in part on the transform block, a coding block, and output the coding block for display.

Figure 6:
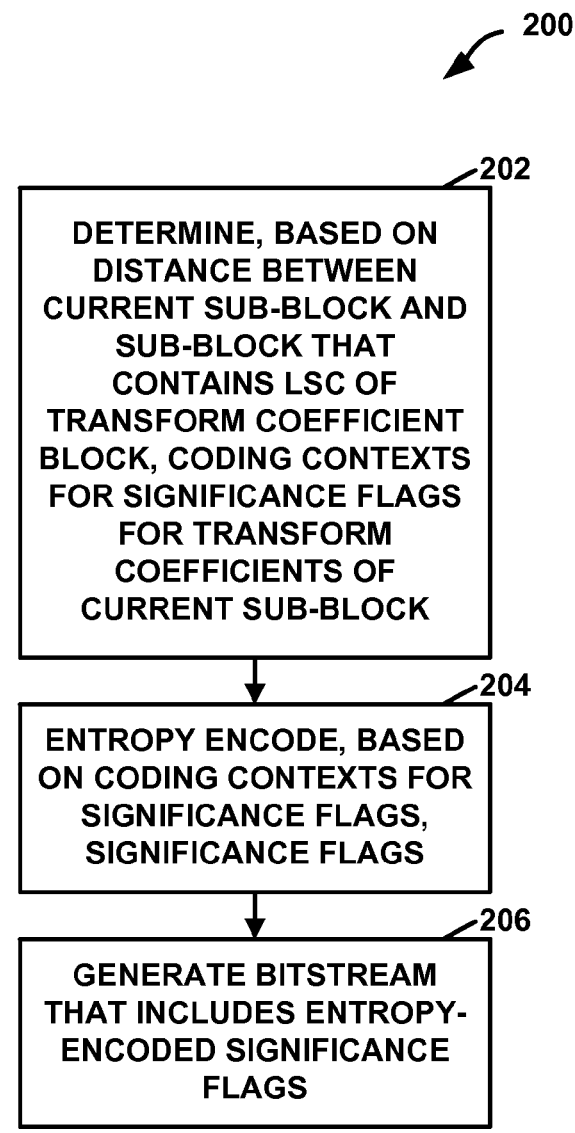
FIG. 6 is a flowchart illustrating an example operation of a video encoder, in accordance with one or more example techniques of this disclosure.

FIG. 6 is a flowchart illustrating an example operation 200 of video encoder 20, in accordance with one or more example techniques of this disclosure. In the example of FIG. 6, video encoder 20 determines, based at least in part on a distance between a current sub-block of a transform coefficient block and a sub-block that contains a LSC of the transform coefficient block, coding contexts for significance flags for transform coefficients of the current sub-block (202). The current sub-block and the sub-block that contains the LSC of the transform coefficient blocks are among a plurality of sub-blocks of the transform coefficient block. Each of the sub-blocks of the transform coefficient block may contain the same number of transform coefficients. In some instances, video encoder 20 may perform the operation of FIG. 11, described elsewhere in this disclosure, to determine, based at least in part on the distance between the current sub-block of the transform coefficient block and the sub-block that contains the LSC of the transform coefficient block, the coding contexts for the significance flags for the transform coefficients of the current sub-block.

Furthermore, video encoder 20 may entropy encode, based on the coding contexts for the significance flags for the transform coefficients of the current sub-block, the significance flags for the transform coefficients of the current sub-block (204). Video encoder 20 may generate a bitstream that includes the entropy-encoded significance flags for the transform coefficients of the current sub-block (206).

Figure 7:
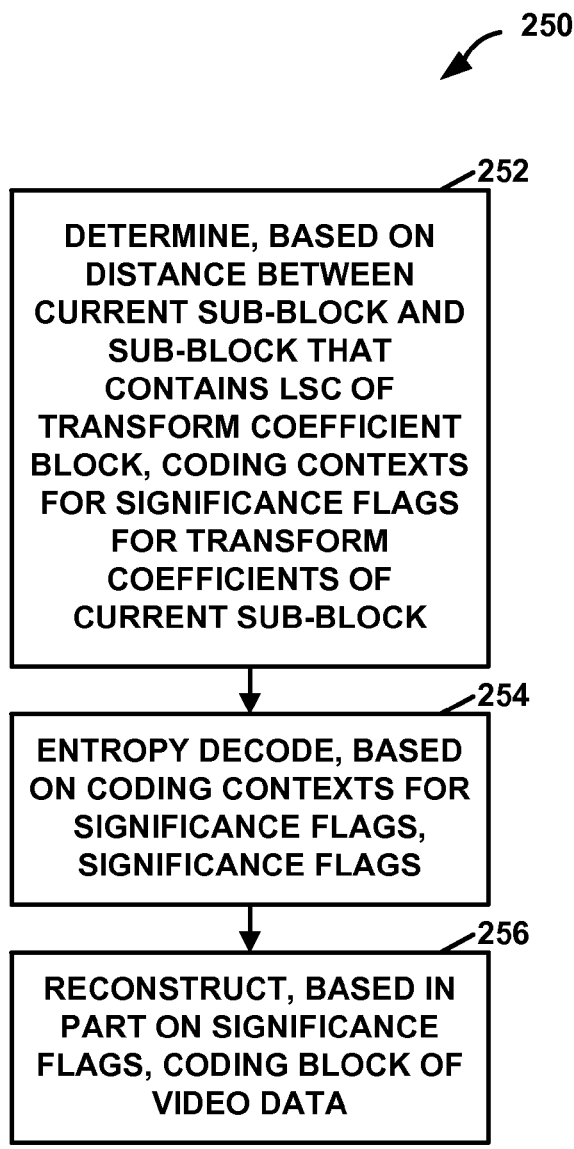
FIG. 7 is a flowchart illustrating an example operation of a video decoder, in accordance with one or more example techniques of this disclosure.

FIG. 7 is a flowchart illustrating an example operation 250 of video decoder 30, in accordance with one or more example techniques of this disclosure. In the example of FIG. 7, video decoder 30 may determine, based at least in part on a distance between a current sub-block of a transform coefficient block and a sub-block that contains a LSC of the transform coefficient block, coding contexts for significance flags for transform coefficients of the current sub-block (252). The current sub-block and the sub-block that contains the LSC of the transform coefficient blocks are among a plurality of sub-blocks of the transform coefficient block. Each of the sub-blocks of the transform coefficient block may contain the same number of transform coefficients. In some instances, video decoder 30 may perform the operation of FIG. 11, described elsewhere in this disclosure, to determine, based at least in part on the distance between the current sub-block of the transform coefficient block and the sub-block that contains the LSC of the transform coefficient block, the coding contexts for the significance flags for the transform coefficients of the current sub-block.

Furthermore, video decoder 30 may entropy decode, based on the coding contexts for the significance flags for the transform coefficients of the current sub-block, the significance flags for the transform coefficients of the current sub-block (254). Video decoder 30 may reconstruct, based in part on the significance flags for the transform coefficients of the current sub-block, a coding block of the video data (256). For instance, video decoder 30 may use the significance flags, along with other transform coefficient syntax elements, to recover transform coefficients of a transform coefficient block. As described above, video decoder 30 may use inverse quantize and inverse transform the transform coefficients of the transform coefficient block to recover a transform block. Video decoder 30 may use the transform block, along with samples from one or more predictive blocks, to reconstruct at least a portion of a coding block.

Figure 8:
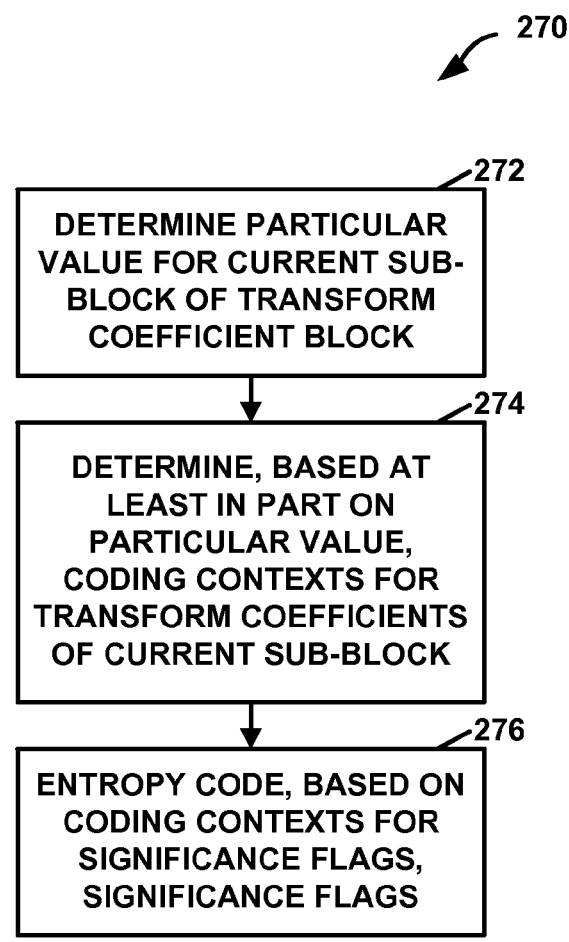
FIG. 8 is a flowchart illustrating an example operation of a video coder, in accordance with one or more example techniques of this disclosure.

FIG. 8 is a flowchart illustrating an example operation 270 of a video coder, in accordance with one or more example techniques of this disclosure. In the example of FIG. 8, the video coder may determine a particular value (e.g., numOne) for a current sub-block of a transform coefficient block (272). The current sub-block is among a plurality of sub-blocks of the transform coefficient block. Each of the sub-blocks of the transform coefficient blocks may contain the same number of transform coefficients. The particular value may be a weighted cumulative count of previous-block transform coefficients that are greater than a threshold, the previous-block transform coefficients being in sub-blocks of the transform coefficient block coded prior to the current sub-block. In some examples, contributions to the particular value of previous-block transform coefficients that are in a sub-block further from the current sub-block have less weight than contributions to the particular value of previous-block transform coefficients in a sub-block closer to the current sub-block. Furthermore, in some examples, the threshold may be equal to 1.

In the example of FIG. 8, the video coder may determine, based at least in part on the particular value for the current sub-block, coding contexts for significance flags for transform coefficients of the current sub-block (274). For instance, the video coder may perform one of the example operations of FIGS. 9, 10, and 12 to determine, based at least in part on the particular value for the current sub-block, coding contexts for significance flags for transform coefficients of the current sub-block. The video coder may entropy code, based on the coding contexts for the significance flags for the transform coefficients of the current sub-block, the significance flags for the transform coefficients of the current sub-block (276).

Figure 9:
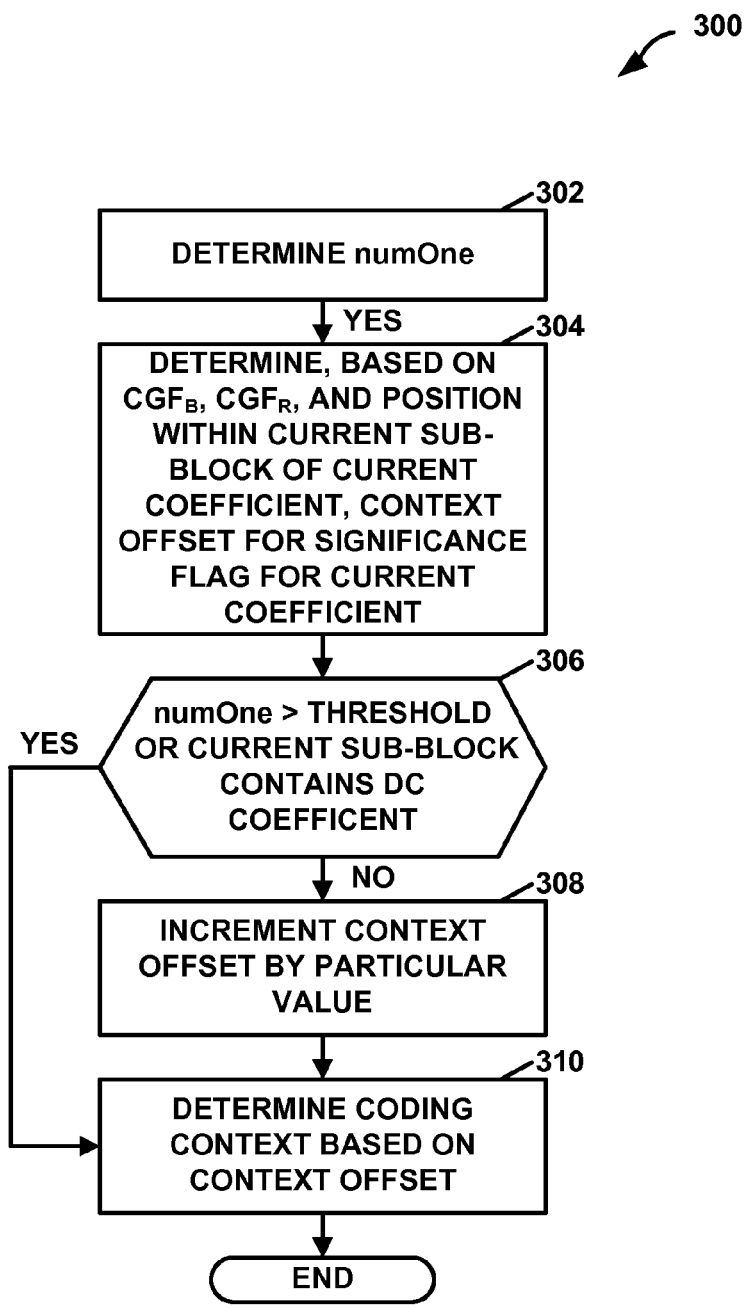
FIG. 9 is a flowchart illustrating an example operation of a video coder, in accordance with a first example technique of this disclosure.

FIG. 9 is a flowchart illustrating an example operation 300 of a video coder, in accordance with a first example technique of this disclosure. In the example of FIG. 9, the video coder may determine the value of numOne (302). As indicated above, numOne may be a weighted cumulative count of the number of transform coefficients with level magnitude greater than 1 in previous sub-blocks of a transform coefficient block.

Next, the video coder may determine, based at least in part on $CGF_B$, $CGF_R$, and a position of within a current sub-block of the transform coefficient block, a context offset for a significance flag of the current transform coefficient in the current sub-block (304). In some examples, the video coder determines the context offset in accordance with the tables shown in FIG. 2. Thus, in such examples, the context offset may be equal to 0, 1, or 2.

Furthermore, the video coder may determine whether numOne is greater than a threshold or whether the current sub-block contains the DC transform coefficient of the transform coefficient block (306). In some examples, the threshold is equal to 0, 1, or another value. In response to determining that numOne is not greater than the threshold and that the current sub-block does not contain the DC transform coefficient of the transform coefficient block ("NO" of 306), the video coder may increment the context offset by a particular value (308). In some examples, the video coder may increment the context offset by 3. Hence, in such examples, when the video coder determines an initial value of the context offset in accordance with the tables of FIG. 2, the context offset may have a value equal to 3, 4, or 5. After incrementing the context offset by the particular value, or after determining that numOne is greater than the threshold or after determining that the current sub-block contains the DC transform coefficient of the transform coefficient block ("YES" of 306), the video coder may determine a coding context based on the context offset (310).

Figure 10:
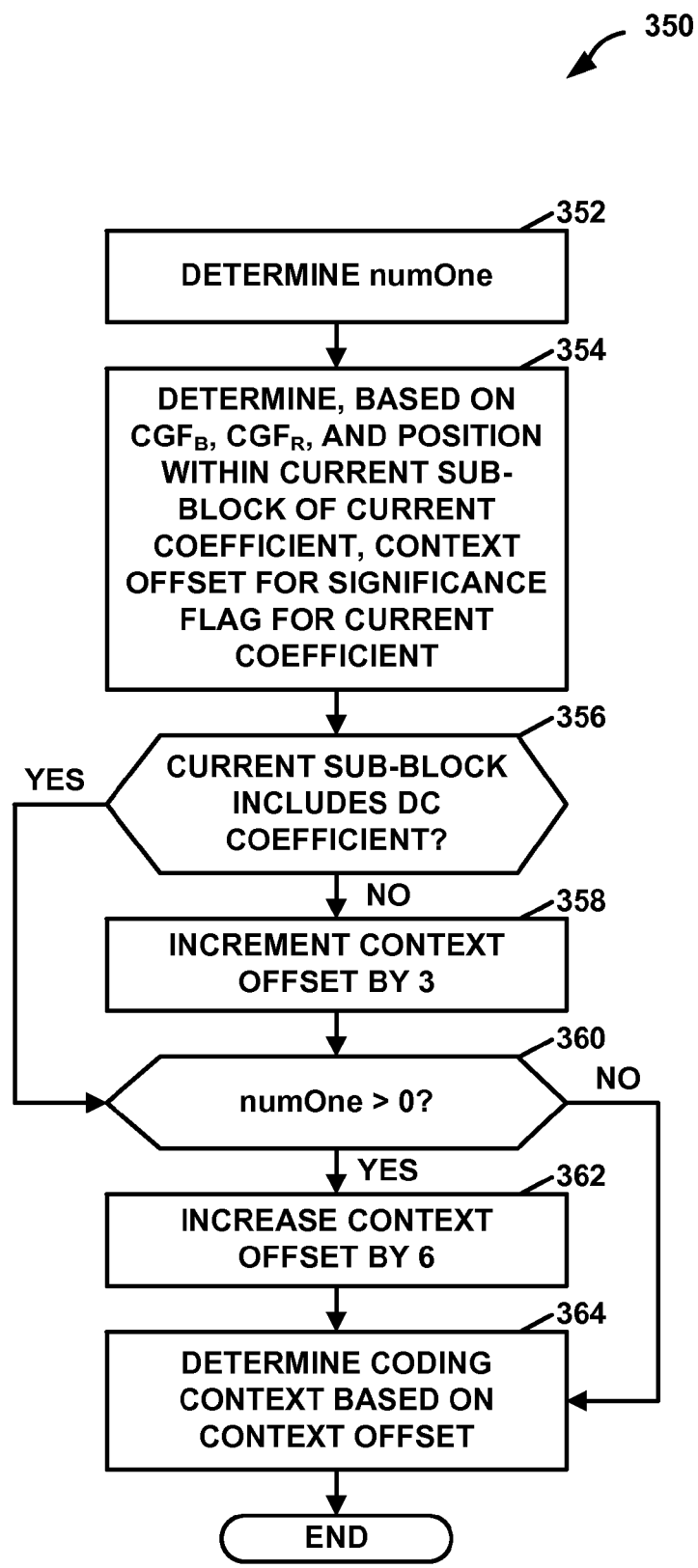
FIG. 10 is a flowchart illustrating an example operation of a video coder, in accordance with a second example technique of this disclosure.

FIG. 10 is a flowchart illustrating an example operation 350 of a video coder, in accordance with a second example technique of this disclosure. In the example of FIG. 10, the video coder determines the value of numOne (352). As indicated above, numOne may be a weighted cumulative count of the number of transform coefficients with level magnitude greater than 1 in a previous sub-block of a transform coefficient block.

Next, the video coder determines, based at least in part on $CGF_B$, $CGF_R$, and a position of within a current sub-block of the transform coefficient block, a context offset for a significance flag of the current transform coefficient in the current sub-block (354). The video coder may determine the context offset in accordance with the tables shown in FIG. 2.

The video coder may then determine whether the current sub-block includes the DC transform coefficient of the transform coefficient block (356). In response to determining that the current sub-block does not include the DC transform coefficient of the transform coefficient block ("NO" of 356), the video coder may increment the context offset for the significance flag of the current transform coefficient by 3 (358). Regardless of whether the current sub-block includes the DC transform coefficient of the transform coefficient block, the video coder may determine whether numOne is greater than 0 (360). In response to determining that numOne is greater than 0 ("YES" of 360), the video coder may increase the context offset for the significance flag of the current transform coefficient by 6 (362). If numOne is not greater than 0 ("NO" of 360), the video coder does not further increment the context offset for the significance flag of the current transform coefficient. After incrementing the context offset by 6, or after determining that numOne is not greater than 0 ("NO" of 360), the video coder may determine a coding context based on the context offset (364).

Figure 11:
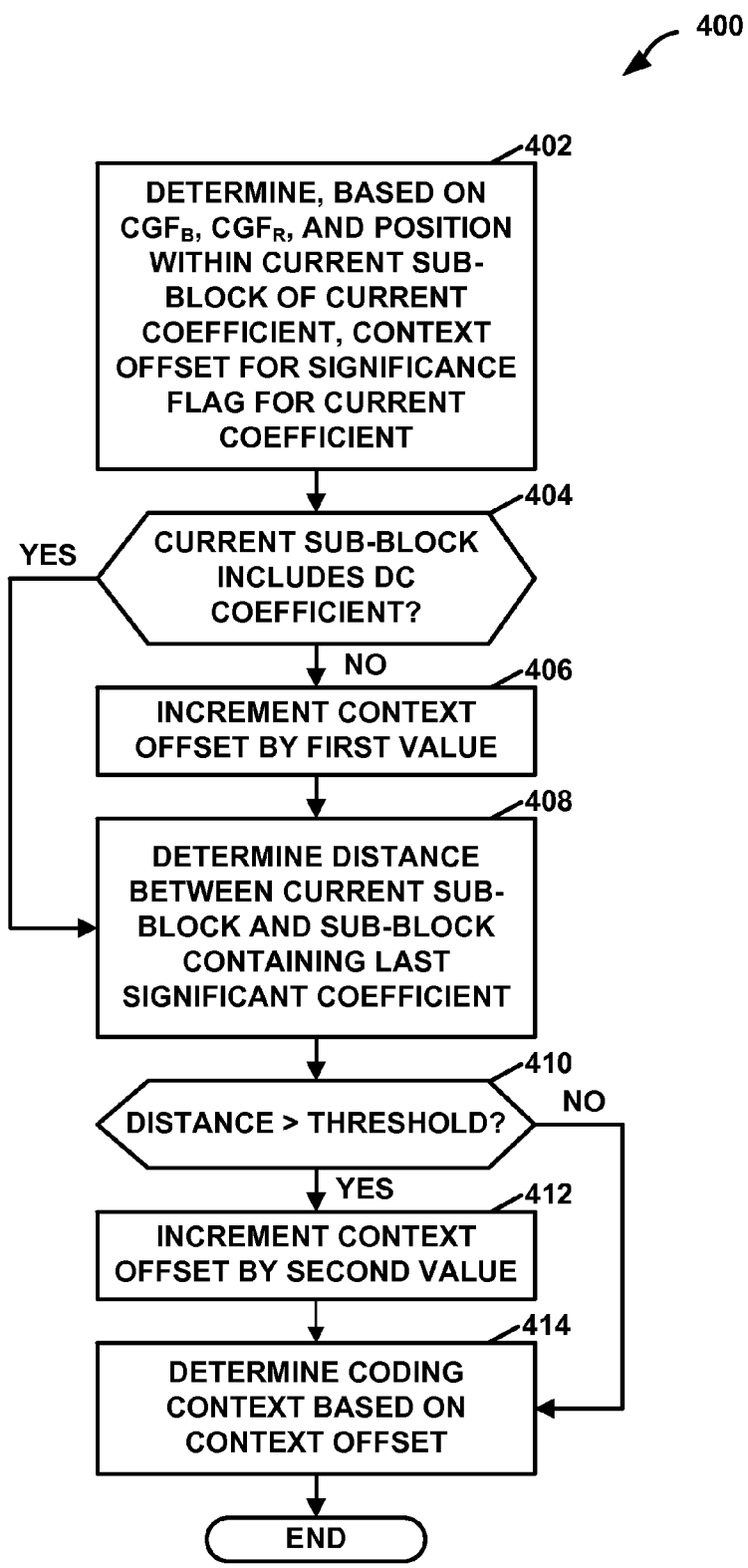
FIG. 11 is a flowchart illustrating an example operation of a video coder, in accordance with a third example technique of this disclosure.

FIG. 11 is a flowchart illustrating an example operation 400 of a video coder, in accordance with a third example technique of this disclosure. In the example of FIG. 11, the video coder determines, based at least in part on $CGF_B$, $CGF_R$, and a position of within a current sub-block of a transform coefficient block, a context offset for a significance flag of the current transform coefficient in the current sub-block (402). The video coder may determine the context offset using the tables shown in FIG. 2. As indicated above, $CGF_B$ may indicate whether there are any non-zero transform coefficients in a sub-block of the transform coefficient block below the current sub-block. $CGF_R$ may indicate whether there are any non-zero transform coefficients in a sub-block of the transform coefficient block right of the current sub-block.

The video coder may then determine whether the current sub-block includes the DC transform coefficient of the transform coefficient block (404). In response to determining that the current sub-block does not include the DC transform coefficient of the transform coefficient block ("NO" of 404), the video coder may increment the context offset for the significance flag of the current transform coefficient by a first value (406). In some examples, the first value is equal to 3. Regardless of whether the current sub-block includes the DC transform coefficient of the transform coefficient block, the video coder may determine a distance between the current sub-block and a sub-block containing a last significant transform coefficient of the transform coefficient block (408). The video coder may then determine whether the distance is greater than a threshold (410). In some examples, the threshold may be equal to 1. In response to determining that the distance is greater than the threshold ("YES" of 410), the video coder may increment the context offset for the significance flag of the current transform coefficient by a second value (412). In some examples, the second value may be equal to 6. Otherwise, if the distance is not greater than the threshold ("NO" of 410), the video coder does not further increment the context offset for the significance flag of the current transform coefficient. Regardless of whether the distance is greater than the threshold, the video coder may determine, based on the context offset, a coding context for the significance flag of the current transform coefficient (414).

Figure 12:
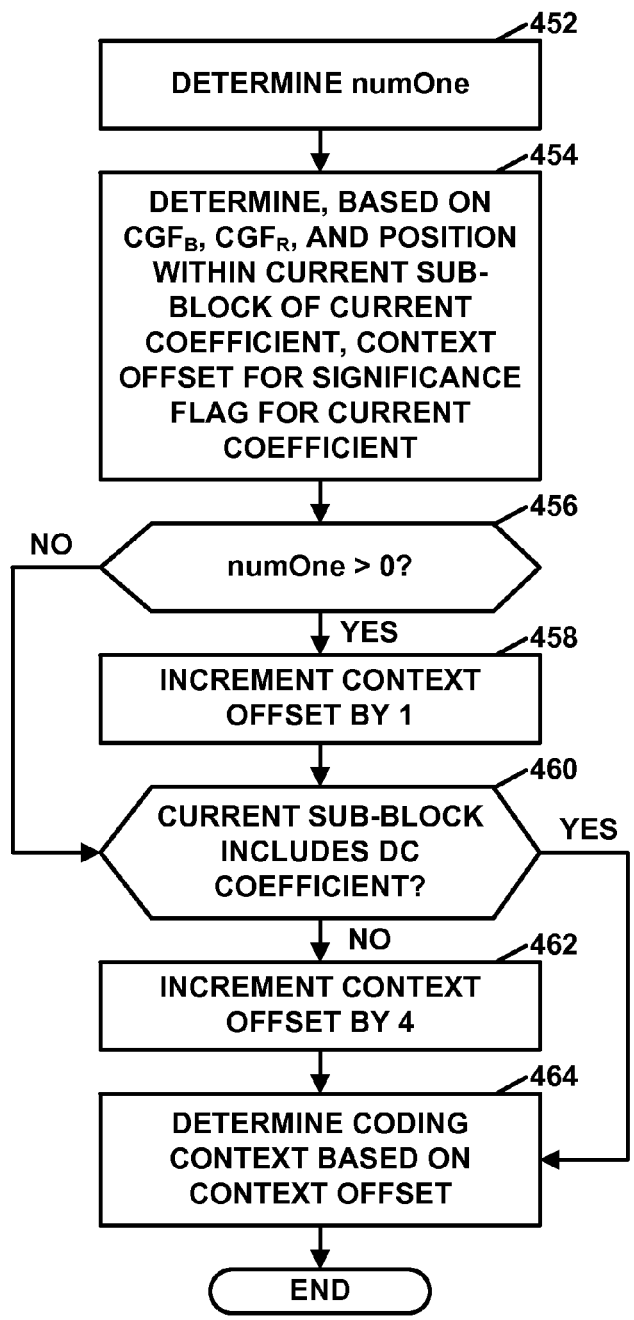
FIG. 12 is a flowchart illustrating an example operation of a video coder, in accordance with a fourth example technique of this disclosure.

FIG. 12 is a flowchart illustrating an example operation 450 of a video coder, in accordance with a fourth example technique of this disclosure. In the example of FIG. 12, the video coder may determine the value of numOne (452). As indicated above, numOne may be a weighted cumulative count of the number of transform coefficients with level magnitude greater than 1 in a previous sub-block of a transform coefficient block.

Next, the video coder may determine, based at least in part on $CGF_B$, $CGF_R$, and a position of within a current sub-block of the transform coefficient block, a context offset for a significance flag for the current transform coefficient in the current sub-block (454). The video coder may determine the context offset in accordance with the tables shown in FIG. 3.

Furthermore, the video coder may determine whether numOne is greater than 0 (456). In response to determining that numOne is greater than 0 ("YES" of 456), the video coder may increment the context offset for the significance flag of the current transform coefficient by 1 (458). Regardless of whether numOne is greater than 0, the video coder may determine whether the current sub-block includes the DC transform coefficient of the transform coefficient block (460). In response to determining that the current sub-block does not include the DC transform coefficient of the transform coefficient block ("NO" of 460), the video coder may increment the context offset for the significance flag of the current transform coefficient by 4 (462). Otherwise, if the current sub-block includes the DC transform coefficient of the transform coefficient block ("YES" of 462), the video coder does not further increment the context offset for the significance flag of the current transform coefficient. After incrementing the context offset by 4, or after determining that the current sub-block includes the DC coefficient ("YES" of 460), the video coder may determine a coding context based on the context offset (464).

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   determining a distance between a first position and a second position, wherein the first position is at a first row of a grid of sub-blocks of a transform coefficient block and a first column of the grid, a current sub-block of the transform coefficient block is in the first row of the grid and the first column of the grid, the second position is at a second row of the grid and a second column of the grid, and a sub-block that contains a last significant coefficient (LSC) of the transform coefficient block is in the second row of the grid and the second column of the grid;
   determining, based at least in part on the distance, coding contexts for significance flags for transform coefficients of the current sub-block,
       wherein the current sub-block and the sub-block that contains the LSC of the transform coefficient block are among the sub-blocks of the transform coefficient block, each of the sub-blocks of the transform coefficient block containing the same number of transform coefficients;
   entropy decoding, based on the coding contexts for the significance flags for the transform coefficients of the current sub-block, the significance flags for the transform coefficients of the current sub-block; and
   reconstructing, based in part on the significance flags for the transform coefficients of the current sub-block, a coding block of the video data.

2. The method of claim 1, wherein determining the distance comprises determining the distance as:

$$d=(i+j)-((lastX>>2)+(lastY>>2)),$$

where d is the distance, i and j represent row and column indices of the current sub-block, lastX and lastY represent row and column indices of the LSC of the transform coefficient block, and >> represents a bitwise right-shift operation.

3. The method of claim 1, wherein determining the coding contexts for the significance flags for the transform coefficients of the current sub-block comprises:
   determining, based on a first coded group flag (CGF), a second CGF, and a position within the current sub-block of a current transform coefficient, a context offset for a significance flag for the current transform coefficient, the first CGF indicating whether there are any non-zero transform coefficients in a sub-block of the transform coefficient block below the current sub-block, the second CGF indicating whether there are any non-zero transform coefficients in a sub-block of the transform coefficient block right of the current sub-block;
   in response to determining that the current sub-block does not include a DC transform coefficient of the transform coefficient block, incrementing the context offset for the significance flag for the current transform coefficient by a first value;
   in response to determining that the distance is greater than a threshold, incrementing the context offset for the significance flag for the current transform coefficient by a second value; and determining, based on the context offset for the significance flag for the current transform coefficient, a coding context for the significance flag for the current transform coefficient.

4. The method of claim 3, wherein the first value is equal to 3 and the second value is equal to 6.

5. The method of claim 3, wherein the threshold is equal to 1.

6. The method of claim 3, wherein:
the threshold is a first threshold, and
determining the coding contexts for the significance flags for the transform coefficients of the current sub-block comprises in response to determining that the distance is greater than a second threshold, incrementing the context offset for the significance flag for the current transform coefficient by a third value, the second threshold being different than the first threshold, the third value being different than the second value.

7. The method of claim 1, wherein each of the sub-blocks of the transform coefficient block is a 4×4 block of transform coefficients.

8. A method of encoding video data, the method comprising:
determining a distance between a first position and a second position, wherein the first position is at a first row of a grid of sub-blocks of a transform coefficient block and a first column of the grid, a current sub-block of the transform coefficient block is in the first row of the grid and the first column of the grid, the second position is at a second row of the grid and a second column of the grid, and a sub-block that contains a last significant coefficient (LSC) of the transform coefficient block is in the second row of the grid and the second column of the grid;
determining, based at least in part on the distance, coding contexts for significance flags for transform coefficients of the current sub-block,
wherein the current sub-block and the sub-block that contains the LSC of the transform coefficient blocks are among the sub-blocks of the transform coefficient block, each of the sub-blocks of the transform coefficient block containing the same number of transform coefficients;
entropy encoding, based on the coding contexts for the significance flags for the transform coefficients of the current sub-block, the significance flags for the transform coefficients of the current sub-block; and
generating a bitstream comprising a sequence of bits forming a representation of encoded pictures of the video data, the bitstream including the entropy-encoded significance flags for the transform coefficients of the current sub-block.

9. The method of claim 8, wherein determining the distance comprises determining the distance as:

$$d=(i+j)-((lastX>>2)+(lastY>>2)),$$

where d is the distance, i and j represent row and column indices of the current sub-block, lastX and lastY represent row and column indices of the LSC of the transform coefficient block, and >> represents a bitwise right-shift operation.

10. The method of claim 8, wherein determining the coding contexts for the significance flags for the transform coefficients of the current sub-block comprises:
determining, based on a first coded group flag (CGF), a second CGF, and a position within the current sub-block of a current transform coefficient, a context offset for a significance flag for the current transform coefficient, the first CGF indicating whether there are any non-zero coefficients in a sub-block of the transform coefficient block below the current sub-block, the second CGF indicating whether there are any non-zero transform coefficients in a sub-block of the transform coefficient block right of the current sub-block;
in response to determining that the current sub-block does not include a DC transform coefficient of the transform coefficient block, incrementing the context offset for the significance flag for the current transform coefficient by a first value;
in response to determining that the distance is greater than a threshold, incrementing the context offset for the significance flag for the current transform coefficient by a second value; and
determining, based on the context offset for the significance flag for the current transform coefficient, a coding context for the significance flag for the current transform coefficient.

11. The method of claim 10, wherein the first value is equal to 3 and the second value is equal to 6.

12. The method of claim 10, wherein the threshold is equal to 1.

13. The method of claim 10, wherein:
the threshold is a first threshold, and
determining the coding contexts for the significance flags for the transform coefficients of the current sub-block comprises in response to determining that the distance is greater than a second threshold, incrementing the context offset for the significance flag for the current transform coefficient by a third value, the second threshold being different than the first threshold, the third value being different than the second value.

14. The method of claim 8, wherein each of the sub-blocks of the transform coefficient block is a 4×4 block of transform coefficients.

15. A video coding device comprising:
a storage medium configured to store video data; and
one or more processors configured to:
determine a distance between a first position and a second position, wherein the first position is at a first row of a grid of sub-blocks of a transform coefficient block and a first column of the grid, a current sub-block of the transform coefficient block is in the first row of the grid and the first column of the grid, the second position is at a second row of the grid and a second column of the grid, and a sub-block that contains a last significant coefficient (LSC) of the transform coefficient block is in the second row of the grid and the second column of the grid;
determine, based at least in part on the distance, coding contexts for significance flags for transform coefficients of the current sub-block,
wherein the current sub-block and the sub-block that contains the LSC of the transform coefficient blocks are among the sub-blocks of the transform coefficient block, each of the sub-blocks of the transform coefficient block containing the same number of transform coefficients;
entropy code, based on the coding contexts for the significance flags for the transform coefficients of the current sub-block, the significance flags for the transform coefficients of the current sub-block; and
perform at least one of the following:
reconstruct, based in part on the significance flags for the transform coefficients of the current sub-block, a coding block of the video data; and generate a bitstream comprising a sequence of bits forming a representation of encoded pictures of the video data, the bitstream including the entropy-encoded significance flags for the transform coefficients of the current sub-block.

16. The video coding device of claim 15, wherein the one or more processors are configured to determine the distance as:

$$d=(i+j)-((lastX>>2)+(lastY>>2)),$$

where d is the distance, i and j represent row and column indices of the current sub-block, lastX and lastY represent row and column indices of the LSC of the transform coefficient block, and >> represents a bitwise right-shift operation.

17. The video coding device of claim 15, wherein the one or more processors are configured to:
determine, based on a first coded group flag (CGF), a second CGF, and a position within the current sub-block of a current transform coefficient, a context offset for a significance flag for the current transform coefficient, the first CGF indicating whether there are any non-zero transform coefficients in a sub-block of the transform coefficient block below the current sub-block, the second CGF indicating whether there are any non-zero transform coefficients in a sub-block of the transform coefficient block right of the current sub-block;
in response to determining that the current sub-block does not include a DC transform coefficient of the transform coefficient block, increment the context offset for the significance flag for the current transform coefficient by a first value;
in response to determining that the distance is greater than a threshold, increment the context offset for the significance flag for the current transform coefficient by a second value; and
determine, based on the context offset for the significance flag for the current transform coefficient, a coding context for the significance flag for the current transform coefficient.

18. The video coding device of claim 17, wherein the first value is equal to 3 and the second value is equal to 6.

19. The video coding device of claim 17, wherein the threshold is equal to 1.

20. The video coding device of claim 17, wherein:
the threshold is a first threshold, and
the one or more processors are configured such that, in response to determining that the distance is greater than a second threshold, the one or more processors increment the context offset for the significance flag for the current transform coefficient by a third value, the second threshold being different than the first threshold, the third value being different than the second value.

21. The video coding device of claim 15, wherein each of the sub-blocks of the transform coefficient block is a 4×4 block of transform coefficients.

22. The video coding device of claim 15, wherein the one or more processors entropy encode the significance flags of the transform coefficient block.

23. The video coding device of claim 15, wherein the one or more processors entropy decode the significance flags of the transform coefficient block.

24. A video coding device comprising:
means for determining a distance between a first position and a second position, wherein the first position is at a first row of a grid of sub-blocks of a transform coefficient block and a first column of the grid, a current sub-block of the transform coefficient block is in the first row of the grid and the first column of the grid, the second position is at a second row of the grid and a second column of the grid, and a sub-block that contains a last significant coefficient (LSC) of the transform coefficient block is in the second row of the grid and the second column of the grid;
means for determining, based at least in part on the distance, coding contexts for significance flags for transform coefficients of the current sub-block,
wherein the current sub-block and the sub-block that contains the LSC of the transform coefficient blocks are among the sub-blocks of the transform coefficient block, each of the sub-blocks of the transform coefficient block containing the same number of transform coefficients;
means for entropy coding, based on the coding contexts for the significance flags for the transform coefficients of the current sub-block, the significance flags for the transform coefficients of the current sub-block; and
at least one of the following:
means for reconstructing, based in part on the significance flags for the transform coefficients of the current sub-block, a coding block of video data; and
means for generating a bitstream comprising a sequence of bits forming a representation of encoded pictures of the video data, the bitstream including the entropy-encoded significance flags for the transform coefficients of the current sub-block.

25. A non-transitory computer-readable data storage medium having instructions stored thereon that, when executed, configure a video coding device to:
determine a distance between a first position and a second position, wherein the first position is at a first row of a grid of sub-blocks of a transform coefficient block and a first column of the grid, a current sub-block of the transform coefficient block is in the first row of the grid and the first column of the grid, the second position is at a second row of the grid and a second column of the grid, and a sub-block that contains a last significant coefficient (LSC) of the transform coefficient block is in the second row of the grid and the second column of the grid;
determine, based at least in part on the distance, coding contexts for significance flags for transform coefficients of the current sub-block,
wherein the current sub-block and the sub-block that contains the LSC of the transform coefficient blocks are among the sub-blocks of the transform coefficient block, each of the sub-blocks of the transform coefficient block containing the same number of transform coefficients;
entropy code, based on the coding contexts for the significance flags for the transform coefficients of the current sub-block, the significance flags for the transform coefficients of the current sub-block; and
at least one of the following:
reconstruct, based in part on the significance flags for the transform coefficients of the current sub-block, a coding block of the video data; and
generate a bitstream comprising a sequence of bits forming a representation of encoded pictures of the video data, the bitstream including the entropy-encoded significance flags for the transform coefficients of the current sub-block.

26. The video coding device of claim 15, wherein the video coding device comprises at least one of:
an integrated circuit;

a microprocessor; or
a wireless handset.

27. The video coding device of claim 15, further comprising a display configured to display decoded video data.

28. The video coding device of claim 15, further comprising a camera configured to capture the video data.

* * * * *